United States Patent
Abe

(10) Patent No.: US 9,665,321 B2
(45) Date of Patent: May 30, 2017

(54) IMAGE PROCESSING SYSTEM, IMAGE PROCESSING METHOD, AND NON-TRANSITORY RECORDING MEDIUM

(71) Applicant: Yoshihiko Abe, Kanagawa (JP)

(72) Inventor: Yoshihiko Abe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/205,388

(22) Filed: Jul. 8, 2016

(65) Prior Publication Data
US 2017/0024171 A1  Jan. 26, 2017

(30) Foreign Application Priority Data
Jul. 24, 2015 (JP) .................................. 2015-146827

(51) Int. Cl.
*G06K 15/00* (2006.01)
*G06F 3/12* (2006.01)

(52) U.S. Cl.
CPC ............ *G06F 3/1235* (2013.01); *G06F 3/126* (2013.01); *G06F 3/1212* (2013.01)

(58) Field of Classification Search
CPC ............................... G06F 3/1212; G06F 3/126
USPC ....................................................... 358/1.14
See application file for complete search history.

(56) References Cited

U.S. PATENT DOCUMENTS

| 2002/0043173 A1* | 4/2002 | Horii ................... B41J 2/17566 101/484 |
| 2002/0048463 A1* | 4/2002 | Otomo ............... G03G 21/1814 399/27 |
| 2012/0237238 A1* | 9/2012 | Tsugawa .............. G03G 15/556 399/61 |
| 2013/0045017 A1* | 2/2013 | Hayakawa ......... G03G 21/1878 399/24 |

(Continued)

FOREIGN PATENT DOCUMENTS

| JP | 7-181850 | 7/1995 |
| JP | 2000-315143 | 11/2000 |
| JP | 2000-315146 | 11/2000 |

(Continued)

*Primary Examiner* — Jerome Grant, II
(74) *Attorney, Agent, or Firm* — Cooper & Dunham LLP

(57) ABSTRACT

An image processing system including a processing execution control device, a plurality of image formation output control devices, and an output destination determiner is provided. The processing execution control device includes a processing execution controller and a control-side drawing information generator to generate drawing information. Each of the image formation output control devices includes an output-side drawing information generator to generate the drawing information and an execution controller to control image forming devices to execute an image formation output based on the drawing information. The output destination determiner determines one of the image formation output control devices as an output destination of an image formation output execution command based on execution propriety of the image formation output that is determined by (Continued)

comparing an amount of developer to be consumed in the image formation output with an amount of developer remaining in each of the image forming devices.

10 Claims, 19 Drawing Sheets

(56) References Cited

U.S. PATENT DOCUMENTS

2016/0223941 A1* 8/2016 Nagai ................ G03G 15/5058

FOREIGN PATENT DOCUMENTS

| | | |
|---|---|---|
| JP | 2003-025686 | 1/2003 |
| JP | 2003-228474 | 8/2003 |
| JP | 2007-004590 | 1/2007 |
| JP | 2007-058544 | 3/2007 |
| JP | 2009-282947 | 12/2009 |
| JP | 2011-243000 | 12/2011 |

* cited by examiner

FIG. 4

JDF INFORMATION

JOB INFORMATION
  NUMBER OF COPIES    : XX COPIES
  NUMBER OF PAGES    : XX PAGES
  RIP CONTROL MODE   : PAGE MODE

EDIT INFORMATION
  ORIENTATION INFORMATION: PORTRAIT
  PRINT SIDE INFORMATION   : BOTH SIDES
  ROTATION                  : 90°
  MAGNIFICATION / REDUCTION : 125%
  IMAGE POSITION
    OFFSET
    POSITION ADJUSTMENT INFORMATION : XX
LAYOUT INFORMATION
  CUSTOM IMPOSITION ARRANGEMENT : XX
  NUMBER OF PAGES            : 2 in 1
  IMPOSITION INFORMATION     : LEFT OPENING
  PAGE ORDER INFORMATION    : XX
  CREEP POSITION INFORMATION : XX
MARGIN INFORMATION              : XX
CROP MARK INFORMATION
  CENTER CROP MARK INFORMATION : XX
  CORNER CROP MARK INFORMATION : XX

FINISHING INFORMATION
  COLLATING INFORMATION     : PAGE UNIT
  STAPLE / BINDING INFORMATION : STAPLE
  PUNCHING INFORMATION      : XX
  FOLDING INFORMATION        : XX
  TRIMMING                    : XX
  OUTPUT TRAY INFORMATION   : TRAY XX
  INPUT TRAY INFORMATION    : TRAY XX
  COVER SHEET INFORMATION   : XX
  . . .

RIP STATUS
  PREFLIGHT     : NOT YET
  NORMALIZATION : NOT YET
  FONT           : NOT YET
  LAYOUT         : NOT YET
  MARK           : NOT YET
  CMM            : NOT YET
  TRAPPING      : NOT YET
  CALIBRATION   : NOT YET
  SCREENING     : NOT YET
  . . .

RIP DEVICE SPECIFICATION
  PREFLIGHT     : HWF SERVER
  NORMALIZATION : HWF SERVER
  FONT           : DFE (ENGINE A)
  LAYOUT         : DFE (ENGINE A)
  MARK           : DFE (ENGINE B)
  CMM            : DFE (ENGINE A)
  TRAPPING      : DFE (ENGINE A)
  CALIBRATION   : DFE (ENGINE A)
  SCREENING     : DFE (ENGINE A)
  . . .

DEVICE SPECIFICATION : DIGITAL PRINTER 1a

FIG. 8

| JDF INFORMATION | IN-DFE JOB ATTRIBUTE |
|---|---|
| A. AMOUNT | NUMBER OF COPIES |
| A. ROTATE | ROTATION |
| . . . | |

FIG. 9

```
RIP PARAMETERS

INPUT-OUTPUT DATA TYPE   : JDF, PDL
  DATA READ INFORMATION    : XXXX
  RIP CONTROL MODE         : PAGE MODE
         . . .

INPUT-OUTPUT IMAGE INFORMATION
    OUTPUT IMAGE INFORMATION

. . .

INPUT IMAGE INFORMATION

. . .

IMAGE HANDLING INFORMATION

. . .

PDL-RELATED INFORMATION
    DATA AREA              : XXXX
    SIZE INFORMATION       : XXXX
    DATA ARRANGEMENT METHOD : XXXX

RIP ENGINE DISCRIMINATION INFORMATION : ENGINE A
```

| CONSUMED AMOUNT OF TONER | C | M | Y | K |
|---|---|---|---|---|
| JOB A | 10 | 10 | 10 | 10 |
| JOB B | 15 | 10 | 5 | 5 |
| JOB C | 0 | 0 | 0 | 15 |
| JOB D | 50 | 1 | 50 | 2 |

⬛ : MAXIMUM VALUE
⬜ : MINIMUM VALUE

| REMAINING AMOUNT OF TONER | C | M | Y | K |
|---|---|---|---|---|
| DEVICE 1a | 60 | 40 | 30 | 20 |
| DEVICE 1b | 50 | 50 | 50 | 50 |
| DEVICE 1c | 100 | 20 | 100 | 20 |
| DEVICE 1d | 20 | 35 | 50 | 65 |
| DEVICE 1e | 10 | 10 | 10 | 10 |

⬛ : MAXIMUM VALUE
⬜ : MINIMUM VALUE

| JOB \ DEVICE | 1a | 1b | 1c | 1d | 1e |
|---|---|---|---|---|---|
| JOB A | OK | OK | OK | OK | OK |
| JOB B | OK | OK | OK | OK | NG |
| JOB C | OK | OK | OK | OK | NG |
| JOB D | OK | OK | OK | OK | NG |

: ELIMINATED DEVICE

FIG. 20

| JOB A | C | M | Y | K | STANDARD DEVIATION |
|---|---|---|---|---|---|
| 1a | 50 | 30 | 20 | 10 | 17 |
| 1b | 40 | 40 | 40 | 40 | 0 |
| 1c | 90 | 10 | 90 | 10 | 46 |
| 1d | 10 | 25 | 40 | 55 | 19 |
| 1e | 0 | 0 | 0 | 0 | 0 |

| JOB B | C | M | Y | K | STANDARD DEVIATION |
|---|---|---|---|---|---|
| 1a | 45 | 30 | 25 | 15 | 13 |
| 1b | 35 | 40 | 45 | 45 | 5 |
| 1c | 85 | 10 | 95 | 15 | 45 |
| 1d | 5 | 25 | 45 | 60 | 24 |
| 1e | — | — | — | — | — |

| JOB C | C | M | Y | K | STANDARD DEVIATION |
|---|---|---|---|---|---|
| 1a | 60 | 40 | 30 | 5 | 23 |
| 1b | 50 | 50 | 50 | 35 | 8 |
| 1c | 100 | 20 | 100 | 5 | 51 |
| 1d | 20 | 35 | 50 | 50 | 14 |
| 1e | — | — | — | — | — |

| JOB D | C | M | Y | K | STANDARD DEVIATION |
|---|---|---|---|---|---|
| 1a | 10 | 39 | −20 | 18 | 24 |
| 1b | 0 | 49 | 0 | 48 | 28 |
| 1c | 50 | 19 | 50 | 18 | 18 |
| 1d | −30 | 34 | 0 | 63 | 40 |
| 1e | — | — | — | — | — |

FIG. 21

| JOB A | C | M | Y | K |
|---|---|---|---|---|
| C | 1 | 1 | 1 | 1 |
| M | 1 | 1 | 1 | 1 |
| Y | 1 | 1 | 1 | 1 |
| K | 1 | 1 | 1 | 1 |

| JOB B | C | M | Y | K |
|---|---|---|---|---|
| C | 1 | 0.67 | 0.33 | 0.33 |
| M | 1.5 | 1 | 0.5 | 0.5 |
| Y | 3 | 2 | 1 | 1 |
| K | 3 | 2 | 1 | 1 |

| JOB C | C | M | Y | K |
|---|---|---|---|---|
| C | 1 | 0 | 0 | 0 |
| M | 0 | 1 | 0 | 0 |
| Y | 0 | 0 | 1 | 0 |
| K | 0 | 0 | 0 | 1 |

| JOB D | C | M | Y | K |
|---|---|---|---|---|
| C | 1 | 0.02 | 1 | 0.04 |
| M | 50 | 1 | 50 | 2 |
| Y | 1 | 0.02 | 1 | 0.04 |
| K | 25 | 0.5 | 25 | 1 |

FIG. 22

| DEVICE 1a | C | M | Y | K |
|---|---|---|---|---|
| C | 1 | 0.67 | 0.5 | 0.33 |
| M | 1.5 | 1 | 0.75 | 0.5 |
| Y | 2 | 1.33 | 1 | 0.67 |
| K | 3 | 2 | 1.5 | 1 |

| DEVICE 1b | C | M | Y | K |
|---|---|---|---|---|
| C | 1 | 1 | 1 | 1 |
| M | 1 | 1 | 1 | 1 |
| Y | 1 | 1 | 1 | 1 |
| K | 1 | 1 | 1 | 1 |

| DEVICE 1c | C | M | Y | K |
|---|---|---|---|---|
| C | 1 | 0.2 | 1 | 0.2 |
| M | 5 | 1 | 5 | 1 |
| Y | 1 | 0.2 | 1 | 0.2 |
| K | 5 | 1 | 5 | 1 |

| DEVICE 1d | C | M | Y | K |
|---|---|---|---|---|
| C | 1 | 1.75 | 2.5 | 3.25 |
| M | 0.57 | 1 | 1.43 | 1.86 |
| Y | 0.4 | 0.7 | 1 | 1.3 |
| K | 0.31 | 0.54 | 0.77 | 1 |

| DEVICE 1e | C | M | Y | K |
|---|---|---|---|---|
| C | 1 | 1 | 1 | 1 |
| M | 1 | 1 | 1 | 1 |
| Y | 1 | 1 | 1 | 1 |
| K | 1 | 1 | 1 | 1 |

FIG. 23

| JOB A | C RATIO DIFFERENCE | M RATIO DIFFERENCE | Y RATIO DIFFERENCE | K RATIO DIFFERENCE | TOTAL |
|---|---|---|---|---|---|
| DEVICE 1a | 0 | -0.33 | -0.5 | -0.67 | -1.5 |
| DEVICE 1b | 0 | 1 | 0 | 0 | 0 |
| DEVICE 1c | 0 | -0.8 | 0 | -0.8 | -1.6 |
| DEVICE 1d | 0 | 0.75 | 1.5 | 2.25 | 4.5 |
| DEVICE 1e | 0 | 0 | 0 | 0 | 0 |

| JOB B | C RATIO DIFFERENCE | M RATIO DIFFERENCE | Y RATIO DIFFERENCE | K RATIO DIFFERENCE | TOTAL |
|---|---|---|---|---|---|
| DEVICE 1a | 0 | 0 | 0.17 | 0 | 0.17 |
| DEVICE 1b | 0 | 0 | 0.25 | 0 | 0.25 |
| DEVICE 1c | 0 | -0.67 | 0 | -0.33 | -1 |
| DEVICE 1d | -2 | 0 | 0.5 | 0 | -1.5 |
| DEVICE 1e | - | - | - | - | - |

| JOB C | C RATIO DIFFERENCE | M RATIO DIFFERENCE | Y RATIO DIFFERENCE | K RATIO DIFFERENCE | TOTAL |
|---|---|---|---|---|---|
| DEVICE 1a | 3 | 2 | 1.5 | 0 | 6.5 |
| DEVICE 1b | 1 | 1 | 1 | 0 | 3 |
| DEVICE 1c | 5 | 1 | 5 | 0 | 11 |
| DEVICE 1d | 0.31 | 0.54 | 0.77 | 0 | 1.62 |
| DEVICE 1e | - | - | - | - | - |

| JOB D | C RATIO DIFFERENCE | M RATIO DIFFERENCE | Y RATIO DIFFERENCE | K RATIO DIFFERENCE | TOTAL |
|---|---|---|---|---|---|
| DEVICE 1a | 0 | 0.65 | -0.5 | 0.29 | 0.44 |
| DEVICE 1b | -49 | 0 | -49 | -1 | -99 |
| DEVICE 1c | 0 | 0.18 | 0 | 0.16 | 0.34 |
| DEVICE 1d | 24 | 1.25 | -22.5 | 2.25 | -43 |
| DEVICE 1e | - | - | - | - | - |

IMAGE PROCESSING SYSTEM, IMAGE PROCESSING METHOD, AND NON-TRANSITORY RECORDING MEDIUM

CROSS-REFERENCE TO RELATED APPLICATIONS

This patent application is based on and claims priority pursuant to 35 U.S.C. §119(a) to Japanese Patent Application No. 2015-146827, filed on Jul. 24, 2015 in the Japan Patent Office, the entire disclosure of which is hereby incorporated by reference herein.

BACKGROUND

Technical Field

The present disclosure relates to an image processing system, an image processing method, and a non-transitory recording medium.

Description of the Related Art

A method of controlling and defining various processing relating to print production is known which uses a data format called JDF (Job Definition Format). According to this method, different types of printers, such as offset printer and digital printer, are collectively controllable. A system using such a method is called HWF (Hybrid Work Flow) System. A server for controlling the HWF system is called HWF server.

In the HWF system, an offset printer and a digital printer each execute an output processing based on the same print data. In the case in which the HWF system operates multiple digital printers, the HWF system or its host system determines which one of the digital printers to output the input print job. In some cases, print jobs are automatically distributed to digital or offset printers based on the capability and/or status of the digital printers, or job distribution rules held by the HWF system.

Digital printers may need a special device management that is different from that for offset printers when executing an output processing. For example, digital printers may need replacement and replenishment of consumable supplies (e.g., printing paper, toner, staples) when they have run out during execution of a print job based on POD (Print On Demand) on cut sheets. If consumable supplies run out during execution of a print job, a time to start printing might be delayed not only in the current print job but also in a succeeding print job.

SUMMARY

In accordance with some embodiments of the present invention, an image processing system is provided. The image processing system includes a processing execution control device, a plurality of image formation output control devices, and an output destination determiner. The processing execution control device includes: a processing execution controller to control execution of a plurality of processings; and a control-side drawing information generator to generate, as one of the plurality of processings, drawing information based on output target image information. Each of the plurality of image formation output control devices includes: an output-side drawing information generator corresponding to the control-side drawing information generator, to generate the drawing information based on the output target image information acquired from the processing execution control device; and an execution controller to control at least one of a plurality of image forming devices to execute an image formation output based on the drawing information generated by the output-side drawing information generator. The output destination determiner determines one of the plurality of image formation output control devices as an output destination of an image formation output execution command based on execution propriety of the image formation output. The execution propriety is determined by comparing an amount of developer to be consumed in the image formation output, that is calculated from the drawing information, with an amount of developer remaining in each of the image forming devices.

In accordance with some embodiments of the present invention, an image processing method is provided. In the image processing method, a plurality of processings is executed in a preset order to execute an image formation output. Drawing information is generated based on output target image information, as one of the plurality of processings. An amount of developer to be consumed by each one of a plurality of image forming devices when executing the image formation output is calculated based on the drawing information. Execution propriety of the image formation output is determined based on a comparison between the calculated amount of developer to be consumed and a remaining amount of developer in each of the image forming devices. One of the plurality of image forming devices is determined as an output destination of an image formation output execution command that instructs execution of the image formation output based on the execution propriety of the image formation output.

In accordance with some embodiments of the present invention, a non-transitory recording medium is provided. The non-transitory recording medium stores a plurality of instructions which, when executed by one or more processors, cause the processors to perform the above image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is an illustration for explaining JDF information according to an embodiment of the present invention;

FIG. 8 is an example of a conversion table according to an embodiment of the present invention;

FIG. 9 is an illustration for explaining RIP parameters according to an embodiment of the present invention;

FIG. 20 is an illustration of an execution example of a print job distribution processing according to an embodiment of the present invention;

FIG. 21 is an illustration of a consumed amount ratio among toners according to an embodiment of the present invention;

FIG. 22 is an illustration of a remaining amount ratio among toners according to an embodiment of the present invention;

FIG. 23 is an illustration of an execution example of a mint job distribution processing according to an embodiment of the present invention.

Figure 1:
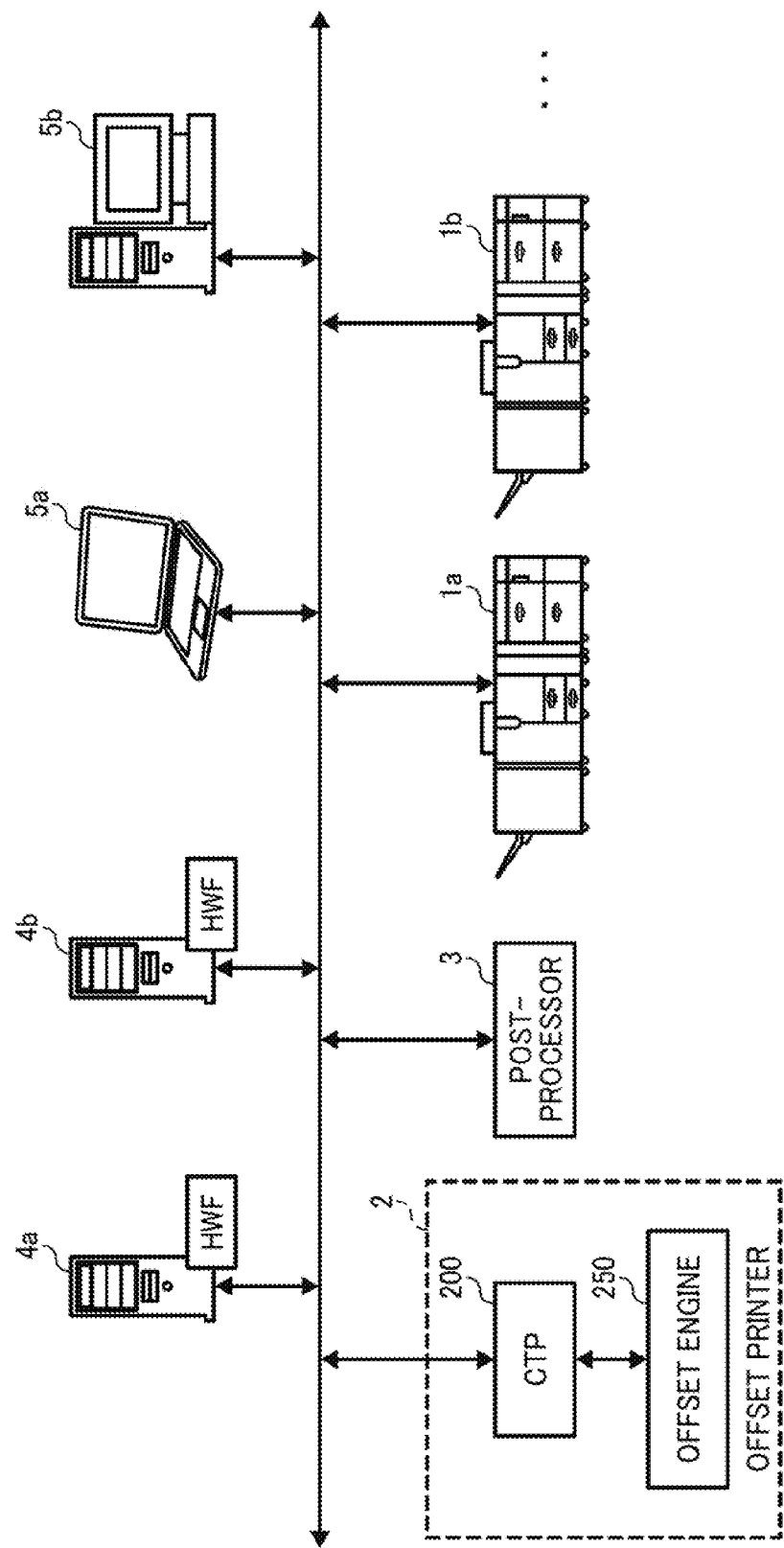
FIG. 1 is a diagrammatic illustration of a HWF system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In accordance with some embodiments of the present invention, an HWF system is provided in which the amount of toner to be consumed in a print job is calculated with a high degree of accuracy so that loner never inns out while a digital printer is executing a print output.

An embodiment of the present invention is described below with reference to the accompany drawings. The present embodiment relates to an image processing system including both an offset printer and a digital printer, which is capable of controlling both printers through the same server. Such a system is called HWF (Hybrid Work Flow) system. In this system, for operating the digital printer, a common RIP (Raster Image Processor) engine is mounted on both a DFE (Digital Front End) for controlling the digital printer and a server.

FIG. 1 is a diagrammatic illustration of the HWF system according to an embodiment of the present invention. As illustrated in FIG. 1, the system includes digital printers 1a and 1b (hereinafter collectively referred to as "digital printer 1"), an offset printer 2, a post-processor 3, HWF servers 4a and 4b (hereinafter collectively referred to as "HWF server 4") and client terminals 5a and 5b (hereinafter collectively referred to as "client terminal 5"), all of which are connected through a network. The digital printer 1 may further include digital printers other than the digital printers 1a and 1b.

Figure 2:
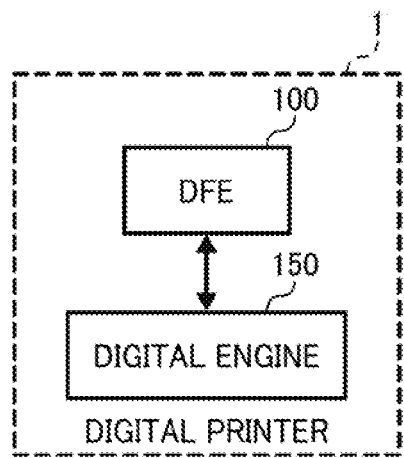
FIG. 2 is a block diagram illustrating a hardware configuration an information processing apparatus according to an embodiment of the present invention.

The digital printer 1 is an electrophotographic or inkjet printer that forms and outputs images without using any plate. Referring to a block diagram of the digital printer 1 illustrated in FIG. 2, the digital printer 1 includes a DFE 100 and a digital engine 150. The DFE 100 serves as an image formation output control device to cause the digital engine 150 to execute a print output. The digital engine 150 serves as an image forming device. The DFE 100 includes a RIP (Raster Image Processor) engine for generating raster data that is image data to which the digital engine 150 refers when executing a print output. The raster data is drawing data.

The configuration of the HWF system is described below with reference to FIG. 1. The offset printer 2 is a printer that forms and outputs images using a plate. The offset printer 2 includes CTP (Computer To Plate) 200 and an offset engine 250. The CTP 200 is a device that generates a plate based on the raster data. As the CTP 200 generates a plate, the offset engine 250 becomes ready for performing an offset printing.

The post-processor 3 is a device that performs post-processing, such as punching, stapling, and bookbinding, for sheets printed out from the digital printer 1 and/or the offset printer 2. The HWF server 4 is a server in which HWF software is installed. The HWF software controls entire processing, including input of job data containing image data to be printed out, print output, and post-processing. The HWF server 4 manages the above-described various processings using information in a format called JDF (Job Definition Format). This information is hereinafter referred to as JDF information. The HWF server 4 serves as a processing execution control device.

In a case in which the print output is an offset punting to be performed by the offset printer 2, the HWF server 4 generates raster data with a built-in RIP engine and transmits the raster data to the CTP 200. The HWF server 4 is equipped with an RIP engine.

On the other hand, in a case in which the print output is to be performed by the digital printer 1, data is transmitted to the DFE 100. Since the DFE 100 is equipped with a RIP engine, as described above, the HWF server 4 transmits RIP-unprocessed print data to the DFE 100. Thus, the digital printer 1 becomes ready for executing the print output.

There is a case in which both the digital printer 1 and the offset printer 2 execute a print output based on the same print data. In this case, if the print outputs resulted from both printers are different, uncomfortable feeling would be brought to a user who receives the print outputs. Therefore, it is preferable that the print outputs resulted from the digital printer 1 and the offset printer 2 are identical.

A difference between print outputs which are resulted from different devices is mainly generated through the RIP processings. Therefore, the difference between the print outputs resulted from the digital printer 1 and the offset printer 2 can be minimized by using a common RIP engine which can perform a commonalized processing for both the digital printer 1 and the offset printer 2.

In the present embodiment, the RIP engine mounted on the HWF server 4 performs a commonalized processing for both the digital printer 1 and the offset printer 2. In addition, the DFE 100 includes a RIP engine commonalized with the RIP engine mounted on the HWF server 4.

Thus, the HWF server 4 and the DFE 100 are equipped with a common RIP engine. Therefore, in a case in which the digital printer 1 executes a print output, it is possible to combine RIP processing performed by the HWF server 4 with that performed by the DFE 100.

The client terminal 5 is an information processing terminal for an operator who is using the system to operate the HWF server 4. The client terminal 5 may be implemented by a PC (Personal Computer). The operator operates the client terminal 5 to display GUI (Graphical User Interface) for operating the HWF server 4, and inputs data and sets the JDF information therethrough. The JDF information is processing setting information.

Figure 3:
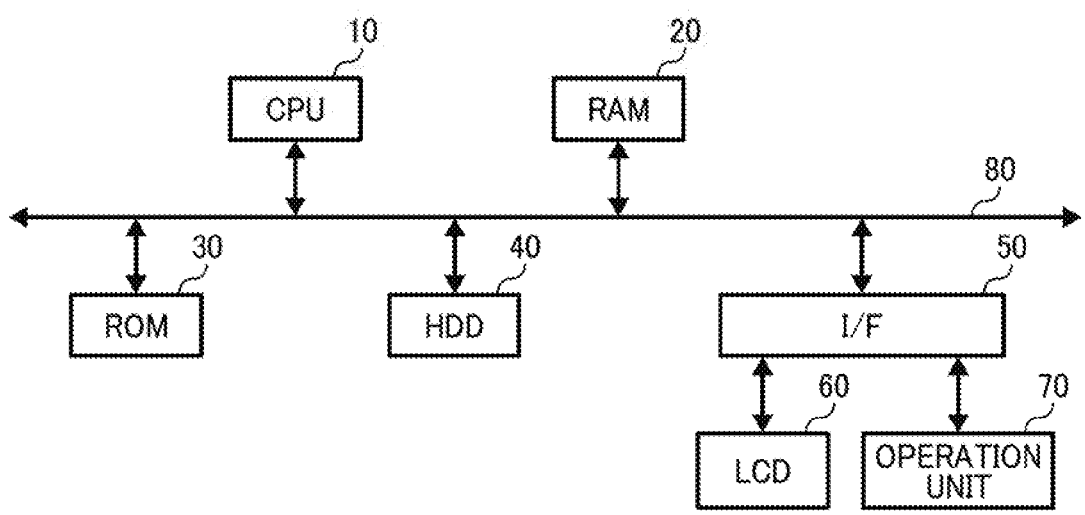
FIG. 3 is a block diagram of a digital printer according to an embodiment of the present invention.

A hardware configuration of each information processing apparatus, such as the DFE 100, the HWF server 4, and the client terminal 5, is described below with reference to FIG. 3. As illustrated in FIG. 3, the information processing apparatus has a configuration similar to that of a typical server or PC (Personal Computer). Specifically, in the information processing apparatus, a CPU (Central Processing Unit) 10, a RAM (Random Access Memory) 20, a ROM (Read Only Memory) 30, an HDD (Hard Disk Drive) 40, and an I/F (Interface) 50 are connected through a bus 80. In addition, an LCD (Liquid Crystal Display) 60 and an operation unit 70 are connected to the I/F 50.

The CPU 10 is a processor that controls the entire operation of the information processing apparatus. The RAM 20 is a high-speed read-write volatile storage medium serving as a working area in which the CPU 10 processes information. The ROM 30 is a read-only non-volatile storage medium in which programs, such as firmware, are stored. The HDD 40 is a read-write non-volatile storage medium in which operating system (OS) and various control programs application programs are stored.

The I/F 50 connects the various hardware and networks through the bus 80 to control data exchange among the various hardware. The LCD 60 is a visual user interface that allows a user to check the status of the information processing apparatus. The operation unit 70 is a user interface, such as a keyboard and a mouse, allowing a user to input information to the information processing apparatus. Since the HWF server 4 is used as a server, the user interfaces such as the LCD 60 and the operation unit 70 can be omitted from the HWF server 4.

In this hardware configuration, as the CPU 10 performs a calculation according to a program stored in the ROM 30 or a program loaded from the HDD 40 or another recording medium (e.g., optical disc) to the RAM 20, a software controller is implemented. A combination of the software controller thus implemented with the hardware configures a functional block which implements the functions of the DFE 100, the HWF server 4, and the client terminal 5.

Next, details of the JDF information are described below. FIG. 4 is an illustration of the JDF information. As illustrated in FIG. 4, the JDF information includes "job information" regarding execution of job "edit information" regarding raster data, and "finishing information" regarding post-processing. The JDF information further includes information regarding "RIP status", "RIP device specification", and "device specification".

As illustrated in FIG. 4, "job information" includes information regarding "number of copies", "number of pages", and "RIP control mode". "Number of copies" is information for specifying the number of copies to be printed out. "Number of pages" is information for specifying the number of pages of each print. "RIP control mode" refers to a control mode for the RIP processing, such as "page mode" and "sheet mode".

"Edit information" includes "orientation information", "print side information", "rotation", "magnification/reduction", "image position", "layout information", "margin information", and "crop mark information". "Orientation information" is information for specifying the orientation of paper for print output, such as "portrait" and "landscape". "Print side information" is information for specifying the side to be printed, such as "both sides" and "one side".

"Rotation" is information for specifying the rotation angle of an image to be output. "Magnification/reduction" is information for specifying the variable magnification ratio of an image to be output. With respect to "image position", "offset" is information for specifying offset of an image to be output. "Position adjustment information" is information for specifying the position adjustment value for an image to be output.

With respect to "layout information", "custom imposition arrangement" is information for specifying the arrangement of the custom surface. "Number of pages" is information for specifying the number of pages per sheet. For example, when two pages are aggregated in one sheet, "2 in 1" is selected. "Page order information" is information for specifying information regarding the order of pages to be printed. "Creep position information" is information for specifying the value regarding the creep position adjustment.

"Margin information" is information for specifying the value regarding the margin, such as fit box and gutter. With respect to "crop mark information", "center crop mark information" is information for specifying the value regarding the center crop mark. "Corner crop mark information" is information for specifying the value regarding the corner crop mark.

"Finishing information" includes "collating information", "stapling/binding information", "punching information", "folding information", "trimming", "output tray information", "input tray information", and "cover sheet information". "Collating information" is information for specifying whether to print out multiple copies of a document with multiple pages, per page or per copy.

"Stapling/binding information" is information for specifying the processing regarding stapling/binding. "Punching information" is information for specifying the processing regarding punching. "Folding information" is information for specifying the processing regarding folding. "Trimming" is information for specifying the processing regarding trimming.

"Output tray information" is information for specifying the output tray. "Input tray information" is information for specifying the input tray. "Cover sheet information" is information for specifying the processing regarding the cover sheet.

"RIP status" is execution status information indicating whether each RIP internal processing included in the RIP processing has been executed or not. FIG. 4 lists "preflight", "normalization", "font", "layout", "mark", "CMM", "trapping", "calibration", and "screening" as RIP internal processing items and describes the processing status for each item. In FIG. 4, the status for each item is described as "not yet", which means "not yet processed". As each item has been executed, the status is changed to "done".

"RIP device specification" is information for specifying where to execute each RIP internal processing, at the HWF server 4 side or the DFE 100 side. For each RIP internal processing item listed in "RIP status", "HWF server" or "DFE" is specified. When "DFE" is specified, information for further specifying one of multiple RIP engines mounted on the DFE 100, such as "DFE (engine A)", is included therein.

"Device specification" is information for specifying the device that executes a print job. In the example illustrated in FIG. 4, "digital printer 1a" is specified. The JDF information further include various information other than those listed in FIG. 4. Details of the various information are described later.

The JDF information illustrated in FIG. 4 is generated as an operator displays GUI of the HWF server 4 on the client terminal 5 and sets various items through the GUI. The RIP engines mounted on the HWF server 4 and the DFE 100 perform RIP processing based on the JDF information. The post-processor 3 executes a post-processing based on the JDF information. There may be a case in which a job is input in the HWF server 4 from external software or system. In this case, the JDF information is already added to the job.

Figure 5:
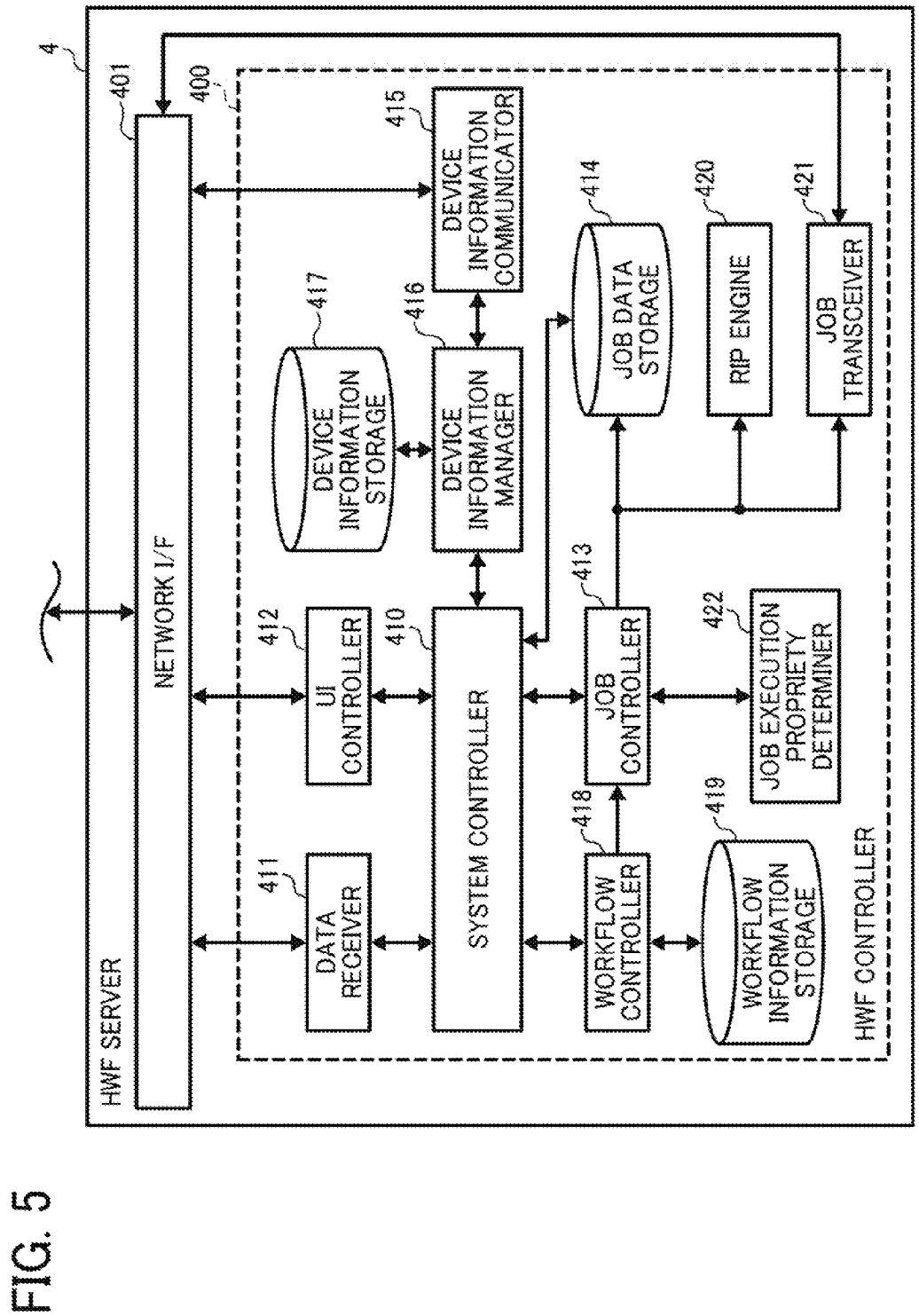
FIG. 5 is a block diagram illustrating a functional configuration of a HWF server according to an embodiment of the present invention.

A functional configuration of the HWF server 4 is described below with reference to FIG. 5. As illustrated in FIG. 5, the HWF server 4 includes a HWF controller 400 and a network I/F 401. The network I/F 401 is an interface for allowing the HWF server 4 to exchange information with other devices therethrough.

The HWF controller 400 manages acquisition of print target data, creation of print jobs, management of workflows, and job distribution to the digital printer 1 and the offset printer 2. In the system according to the present embodiment, a document input processing is defined as a processing in which job data of a print target is input in the HWF server 4 and acquired by the HWF controller 400. The HWF controller 400 is implemented by dedicated software, which is installed in an information processing apparatus. This software is called HWF software.

A system controller 410 controls the entirety of the HWF controller 400. The system controller 410 sends a command to each part of the HWF controller 400 to cause each part to execute each processing, to implement each function of the HWF controller 400. A data receiver 411 receives job data of a print target sent from other systems or job data input through an operation by an operator.

A UI (User Interface) controller 412 controls an operation performed by an operator through the client terminal 5. The client terminal 5 displays GUI for operating the HWF server 4. The UI controller 412 acquires information on the operation performed through the GUI displayed on the client terminal 5 through the network.

The UI controller 412 notifies the system controller 410 of the information on the operation thus acquired through the network. The GUI can be displayed on the client terminal 5 by means of software previously installed in the client terminal 5 or information provided to the client terminal 5 from the UI controller 412 through the network.

An operator operates the GUI displayed on the client terminal 5 to select job data of a document to be input. The client terminal 5 transmits the selected job data to the HWF server 4, and the data receiver 411 acquires the job data. The system controller 410 registers the job data acquired by the data receiver 411 in a job data storage 414.

In particular, the job data transmitted from the client terminal 5 to the HWF server 4 is generated at the client terminal 5 based on document data and image data selected at the client terminal 5. The job data is in a PDL (Page Description Language) format, such as PDF (Portable Document Format) and Post Script.

Alternatively, data in a dedicated application format or in a general image data format may be transmitted from the client terminal 5 to the HWF server 4. In this case, the system controller 410 causes a job controller 413 to generate job data based on the acquired data. The job controller 413 generates job data by the function of a RIP engine 420 based on the print target data.

The print target data registered in the job data storage 414 is PDL information, as described above. The PDL information may be either temporary data generated based on the print target data or intermediate data a part of which has been processed. This information is used as output target image information. In a case in which intermediate data is stored in the job data storage 414, the information might have been in the process of being processed in the HWF server 4, or the intermediate data as it is might have been registered in the HWF server 4 as job data. Hereinafter, "PDL information" refers to temporary data which has not been RIP-processed, and "intermediate data" refers to data a part of which has been RIP-processed.

The JDF information illustrated in FIG. 4 is set and generated as an operator operates GUI displayed on the client terminal 5, as described above. Alternatively, in a case in which a job is input from external software or system in the HWF server 4, JDF information is already added to the job. The JDF information thus acquired is received by the data receiver 411 as job data along with the PDL information. The system controller 410 associates the JDF information thus acquired with the PDL information and registers them in the job data storage 414.

In the present embodiment, JDF information is used as job attribute information. According to another embodiment information in other formats, such as PPF (Print Production Format) information can also be used as job attribute information.

The system controller 410 is capable of dividing the received job data per print unit (e.g., per page) based on the operation performed by an operator through GUI displayed on the client terminal 5. Each of the divided job data is separately registered in the job data storage 414.

As an output destination device for each of the divided jobs is selected based on the operation performed by an operator through GUI displayed on the client terminal 5, the selection result is associated with the job data and stored in the job data storage 414. In one example, the front cover part of a document may be output to the digital printer 1 while the body text part of the document may be output to the offset printer 2.

A device information manager 416 acquires and manages information on other devices included in the system, such as the digital printer 1, the offset printer 2, and the post-processor 3, while storing the information in a device information storage 417. Examples of the information on other devices include: network address assigned to each device when the device is connected to the network; and functional information on each device. Examples of the functional information on each device include, but are not limited to, printing speed, usable post-processing functions, and operational state.

A device information communicator 415 acquires information on other devices included in the system through the network I/F 401 on a regular basis. Thus, the device information manager 416 updates information on other devices stored in the device information storage 417 on a regular basis. Accordingly, even when the information on other devices has dynamically changed, the information stored in the device information storage 417 is always kept accurate.

A workflow controller 418 determines the execution order of processings for processing the job data registered in the job data storage 414 in the system, and stores the execution order information in a workflow information storage 419. The execution order of processings thus determined is defined in a workflow. To follow that order, the workflow is controlled such that one processing is executed when the previous processing completes.

Figure 6:
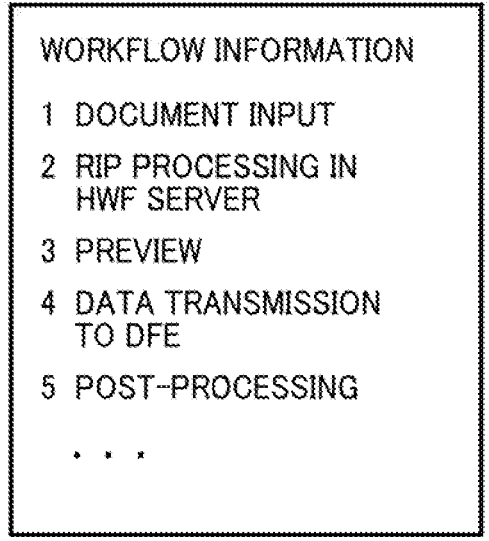
FIG. 6 is an illustration for explaining workflow information according to an embodiment of the present invention.

Thus, the workflow information storage 419 stores workflow information in which various processings to be executed in the HWF system are combined according to the specified order. FIG. 6 is an illustration of the workflow information. On the other hand, parameters used for executing various processings are specified in JDF information, as described above. The workflow information storage 419 previously stores the workflow information that is set based on the operation performed by an operator through GUI displayed on the client terminal 5.

An instruction for executing the job data registered in the HWF server 4 is notified to the system controller 410 through the UI controller 412 based on an operation performed by an operator through GUI displayed on the client terminal 5. Thus, the system controller 410 selects an output destination device.

In the above-described case in which an output destination device is selected on GUI displayed on the client terminal 5, the system controller 410 selects the output destination device in accordance with the specified content. Alternatively, it is possible that an output destination device is automatically selected based on the comparison result between the job content and the device properly.

In the case in which an output destination device is automatically selected based on the comparison result between the job content and the device property, the system controller 410 acquires information on usable devices from the device information manager 416. As the output destination device is thus determined, the system controller 410 adds information indicating the determined output destination device to JDF information.

After the output destination device is determined the system controller 410 instructs the workflow controller 418 to execute the job. At this time, workflow information previously registered in the workflow information storage 419 based on an operation performed by an operator may be used, or alternatively, new workflow information may be generated based on the content set according to an operation performed by an operator.

In response to receiving of the execution instruction from the system controller 410, the workflow controller 418 instructs the job controller 413 to execute each process in the specified execution order according to the specified workflow information or newly generated workflow information. The workflow controller 418 serves as a processing execution controller.

In response to receiving of the execution instruction, the job controller 413 inputs the PDL information and the JDF information in the RIP engine 420 to cause the RIP engine 420 to execute RIP processing. The JDF information contains information indicating by which each of multiple RIP internal processings is to be executed, the RIP engine in the HWF server 4 or that in the DFE 100.

The job controller 413 refers to one of various information included in the JDF information which relates to RIP processings distribution. In a case in which a processing specified by the workflow controller 418 is to be executed in the HWF server 4, the job controller 413 causes the RIP engine 420 to execute the specified processing. The RIP engine 420 then executes RIP processing based on the parameters specified in the JDF information in accordance with the instruction from the job controller 413.

After executing the RIP processing, the RIP engine 420 updates the RIP status of the executed RIP processing. Thus, the statuses of the RIP internal processings which have been executed in the HWF server 4 are changed to "done". The RIP engine 420 serves as a control-side drawing information generator.

A RIP execution result data, generated when the RIP processing is executed, is in the form of PDL information, intermediate data, or raster data. Depending on the content of the RIP internal processing, as the processing proceeds, intermediate data is generated based on initial PDL information, and eventually, raster data is generated. The RIP execution result data is associated with the job in execution and stored in the job data storage 414.

When one RIP internal processing completes, the RIP engine 420 notifies the job controller 413 of the completion, and the job controller 413 notifies the workflow controller 418. Then, the workflow controller 418 starts controlling the next processing according to the workflow information.

When the job content received from the workflow controller 418 is a request for other system, the job controller 413 inputs job data in a format corresponding to the other system in a job transceiver 421, and causes the job transceiver 421 to transmit the job data. When the job data is to be transmitted to the offset printer 2, print target data is converted into raster data and transmitted as the job data.

A job execution propriety determiner 422 refers to the raster data and calculates the amount of toner to be consumed when the raster data is printed out. The job execution propriety determiner 422 then determines whether toner will run out or not before the DFE 100 completes print output of the raster data, based on information regarding the remaining amount of toner in the DFE 100, received through the data receiver 411, and the consumed amount of toner thus calculated. The job execution propriety determiner 422 then transmits job data to at least one of the DFEs 100 which is determined that toner will not run out therein. The job execution propriety determiner 422 determines propriety of print job execution in the digital printer 1 and rewrites information on "device specification" illustrated in FIG. 4, if necessary.

The HWF server 4 includes multiple RIP engines 420 each corresponding to respective digital printers 1a and 1b. When the job execution propriety determiner 422 determines propriety of print job execution, one of the RIP engines 420 which corresponds to one of the digital printers 1a and 1b, the propriety of execution of which is to be determined, generates raster data. Therefore, the amount of toner to be consumed in the digital printers 1a and 1b can be determined at a high degree of accuracy.

On the other hand, when job data is transmitted to the digital printer 1, the job controller 413 specifies one of the multiple RIP engines included in the DFE 100 which is identical to the RIP engine 420 and inputs the job data in the job transceiver 421. Thus, the job transceiver 421 specifies the RIP engine corresponding to and identical to the RIP engine 420 and transmits the job data to the DFE 100.

The job transceiver 421 transmits job data including PDL information or intermediate data, and JDF information, to the DFE 100. Alternatively, when the PDL information or intermediate data is stored in an external resource, the storage destination of the PDL information or intermediate data is described in the JDF information in URL, which is to be transmitted as job data. In this case, a receiver that has received the JDF information accesses the URL to acquire the PDL information or intermediate data.

Figure 7:
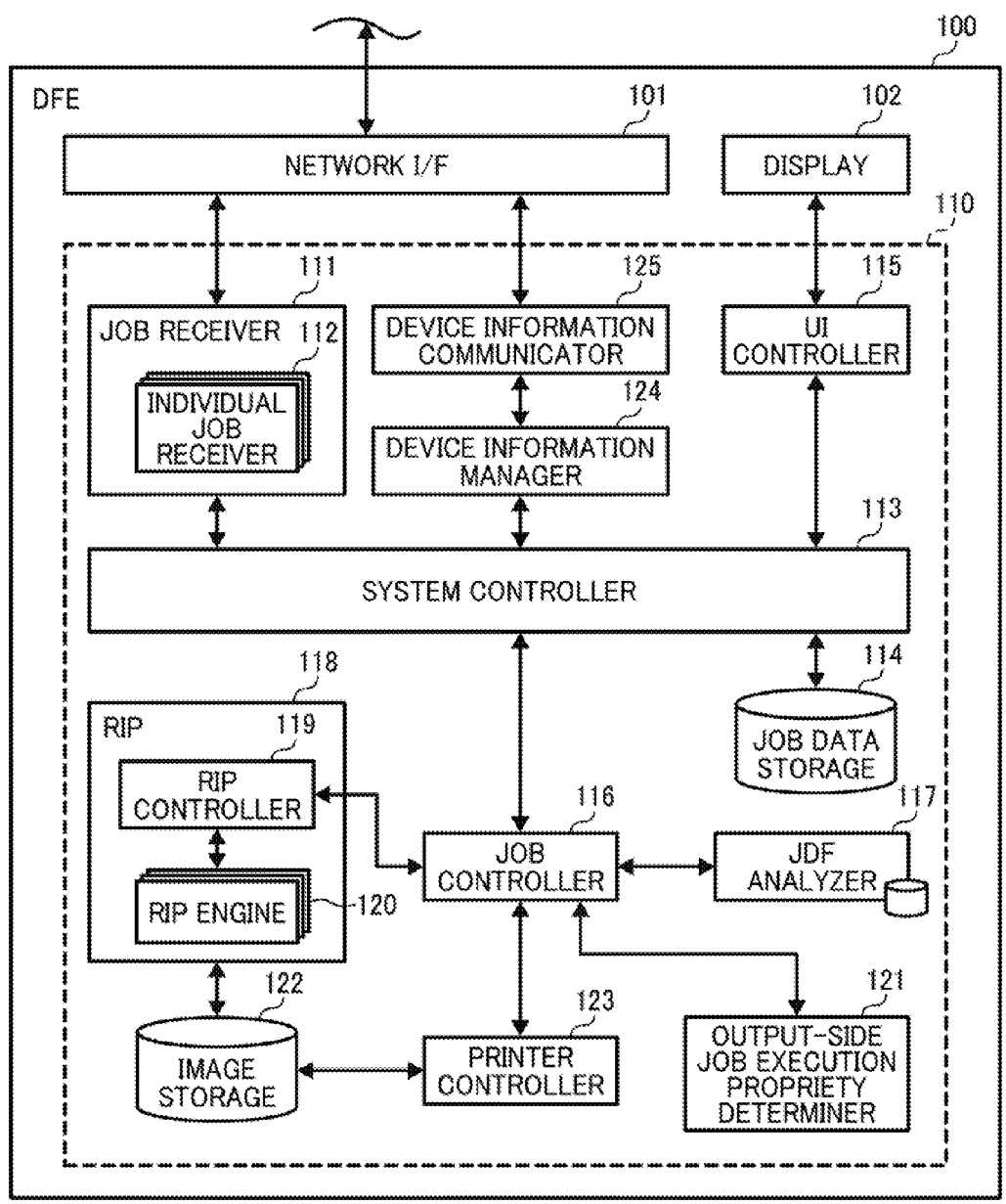
FIG. 7 is a block diagram illustrating a functional configuration of a DFE according to an embodiment of the present invention.

A functional configuration of the DFE 100 is described below with reference to FIG. 7. The DFE 100 receives job data from the HWF server 4, and controls the received job, RIP processing, and the digital engine 150. The HWF server 4 transmits job data to the DFE 100 to cause the digital engine 150 to execute a print output. Thus, the DFE 100 serves as a server for providing a digital printing function to the HWF server 4.

The job control function provided by the DFE 100 refers to a function of controlling a series of operations, including receipt of job data, analysis of JDF information, creation of raster data, and print output by the digital engine 150. The RIP processing execution control refers to a control which causes a RIP engine to execute RIP processing based on information generated by the analysis of JDF information and PDL information.

The information generated by the analysis of JDF information is information which has been extracted from the JDF information illustrated in FIG. 4 to be used for RIP processing and has been converted into a format readable by the DFE 100. This information is hereinafter called as "in-DFE job attribute". As the RIP processing is executed referring to the in-DFE job attribute and the PDL information, intermediate data and raster data are created.

The function of controlling the digital engine 150 refers to a function of transmitting a part of the raster data and in-DFE job attribute to the digital engine 150 to cause the digital engine 150 to execute a print output. These functions correspond to one or more blocks illustrated in FIG. 7. Each block illustrated in FIG. 7 is implemented as the CPU 10 performs a calculation according to a program loaded to the RAM 20 or stored in the ROM 30 to operate other hardware according to the program as described above referring to FIG. 3.

The DFE 100 includes multiple RIP engines inside. Each of the multiple RIP engines corresponds to other RIP engine in other device which has a possibility of transmitting a job to the DFE 100 in the HWF system. In the present embodiment, each of the multiple HWF servers 4a and 4b includes respective RIP engines. Therefore, the DFE 100 includes multiple RIP engines each of which corresponding to the respective RIP engines included in the HWF servers 4a and 4b.

A job receiver 111 includes multiple individual job receivers 112 inside. Each of the individual job receivers 112 receives job data from the HWF server 4 through a network I/F 101. Each of the multiple individual job receivers 112 respectively corresponds to each of multiple RIP engines included in the DFE 100. Each of the individual job receivers 112 serves as an individual receiver.

As described above, when job data is transmitted from the HWF server 4 to the DFE 100, a corresponding RIP engine is specified. Thus, in the job receiver 111, one of the individual job receivers 112 which corresponds to the specified RIP engine receives the job data.

Job data may be input in the DFE 100 either from the HWF server 4 through the network or through a portable storage medium (e.g., universal serial bus (USB) memory). In the present embodiment, job data contains JDF information. In a case in which job data does not contain JDF information, the job receiver 111 creates dummy JDF and adds it as JDF information to the job data.

The individual job receivers 112 are provided corresponding to the multiple RIP engines, as described above. Also, the individual job receivers 112 serve as virtual printers having preset job settings. Namely, in a case in which the individual job receivers 112 each have preset settings regarding the corresponding RIP engine in the DFE 100 as well as job content, a job with a preset setting can be executed by specifying one of the multiple individual job receivers 112.

One example of the preset settings for the individual job receivers 112 includes "pass through mode". "Pass through mode" refers to a mode in which analysis of JDF information is executed by the RIP engine, not by a JDF analyzer 117 provided separately from the RIP engine in the DFE 100.

This mode makes it possible to use JDF information which is in a format unsupported by the JDF analyzer 117, or to use a RIP engine which is difficult to externally equipped with a JDF analyzing function in the HWF server 4 and the DFE 100. In the present embodiment, "pass through mode" is used when the RIP engine 420 mounted on the HWF server 4 and the RIP engines 120 mounted on the DFE 100 share the processings. One of the RIP engines 120 corresponding to and identical to the RIP engine 420 is used as an output-side drawing information generator.

In a case in which RIP processings are distributed to the HWF server 4 and the DFE 100, it is preferable that the processings are successively executed without a distinction between the HWF server 4 and the DEL 100 being perceived as much as possible. Therefore, when data which has been partially processed in the HWF server 4 is input in the DFE 100, it is preferable that the data is successively processed in a continuous manner with a JDF analysis processing which may be performed when unprocessed job data is input being omitted.

In the present embodiment, the HWF server 4 and the DFE 100 include a common RIP engine corresponding to and identical to each other. Thus, the RIP processings can be well controlled. In this case, it is preferable that data processed by one RIP engine is transferred to the other RIP engine as it is. Such a control can be well achieved by using "pass through mode" described above.

A system controller 113 stores job data received by the individual job receivers 112 in a job data storage 114, or transfers the job data to a job controller 116. In a case in which the DFE 100 is configured to store job data, the system controller 113 stores job data in the job data storage 114. In a case in which whether or not to store job data in the job data storage 114 is described in JDF information, the system controller 113 follows the description.

The above-described case in which job data is stored in the job data storage 114 may refer to a case in which a print content is previewed in the DFE 100. In this case, the system controller 113 acquires print target data, i.e., PDL information and intermediate data, included in the job data, from the job data storage 114. The system controller 113 then generates preview data and transfers it to a UI controller 115. The UI controller 115 then displays the preview of the print content on a display 102.

In generating preview data, the system controller 113 transfers print target data to the job controller 116 and requests the job controller 116 to generate preview data. The job controller 116 transfers the print target data to a RIP unit 118 to cause the RIP unit 18 to generate preview data, and transfers the generated preview data to the system controller 113.

In a case in which an operator makes a change to JDF information in the DFE 100, job data is stored in the job data storage 114. In this case, the system controller 113 acquires the JDF information from the job data storage 114 and transfers it to the UI controller 115. Thus, the JDF information of the job data is displayed on the display 102, and an operator can make a change thereto by operation.

When an operator operates the DFE 100 to make a change to the JDF information, the UI controller 115 accepts the change and notifies the system controller 113 of the change. The system controller 113 reflects the accepted change to the target JDF information to update it, and stores the updated JDF information in the job data storage 114.

In response to receiving of a job execution instruction, the system controller 113 transfers the job data stored in the job data storage 114 to the job controller 116. The job execution instruction may be input either from the HWF server 4 through the network or through an operation performed by an operator in the DFE 100. In a case in which a job execution time is set in JDF information, the system controller 113 transfers the job data stored in the job data storage 114 to the job controller 116 at the set time.

The job data storage 114 is a storage area for storing job data. The job data storage 114 can be implemented by the HDD 40 illustrated in FIG. 3. Alternatively, the job data storage 114 may be a storage device connected to the DFE 100 through a USB interface or a network.

The UI controller 115 accepts display of information on the display 102, as described above, and an operation performed by an operator on the DFE 100. In the above-described JDF information editing operation, the UI controller 115 interprets the JDF information and displays a print job content on the display 102.

The job controller 116 performs a control relating to job execution according to a job execution instruction sent from the system controller 113. In particular, the job controller 116 controls JDF analysis processing performed by the JDF analyzer 117, RIP processing performed by the RIP unit 118, and control processing for the digital engine 150 performed by a printer controller 123.

In response to receiving of a job execution instruction from the system controller 113, the job controller 116 inputs JDF information included in the job data in the JDF analyzer 117 and requests JDF conversion. The JDF conversion refers to a processing which converts JDF information described in a format of its generator into that in another format recognizable in the RIP unit 118. Thus, the JDF analyzer 117 serves as a processing setting information converter.

On the other hand, when "pass through mode" is specified, the job controller 116 inputs JDF information included in the job data acquired from the system controller 113 in the RIP unit 118 as it is. Specification of "pass through mode" is described in JDF information by, for example, the individual job receivers 112. In a case in which "pass through mode" is specified by the individual job receivers 112, specification of "page mode" or "sheet mode" in accordance with the specified RIP engine 120 is also described.

The JDF analyzer 117 converts JDF information in a format of its generator into that in a format recognizable in the RIP unit 118, as described above. The JDF analyzer 117 is holding a conversion table inside. The JDF analyzer 117 extracts necessary information for the RIP unit 118 from the JDF information, according to the conversion table, and converts its format. Thus, the above-described in-DFE job attribute is generated.

FIG. 8 is an illustration of the conversion table held by the JDF analyzer 117. As illustrated in FIG. 8, the conversion table associates the description format in the JDF information with that in the in-DFE job attribute. For example, information regarding "number of copies" illustrated in FIG. 4 is actually described as "A•Amount" in the JDF information. "A•Amount" is converted into the description of "number of copies" after the in-DFE job attribute is generated.

The in-DFE job attribute is generated as the JDF analyzer 117 executes a processing using the conversion table illustrated in FIG. 8. Information described in the in-DFE job attribute include, for example, "job information", "edit information", and "finishing information", each of which is illustrated in FIG. 4.

In generating the in-DFE job attribute, the JDF analyzer 117 sets "RIP control mode" in the in-DFE job attribute. As "RIP control mode", "page mode" or "sheet mode" is specified. The JDF analyzer 117 assigns "RIP control mode" in accordance with the type of the individual job receiver 112 which has received job data, the job content, and the type of HWF software composing the HWF server 4 that has sent the job data.

In the present embodiment, aggregate print setting in a print job is treated as "page mode". Details of "RIP control mode" are described later.

The job controller 116 generates "RIP parameters" based on the in-DFE job attribute generated by the JDF analyzer 117. The job controller 116 transfers the RIP parameters to a RIP controller 119 in the RIP unit 118 to cause the RIP unit 118 to execute RIP processing. Thus, the RIP unit 118 executes RIP processing based on the RIP parameters.

FIG. 9 is an illustration of contents of the RIP parameters. The RIP parameters include, "input-output data type", "data read information", and "RIP control mode", as initial information. "Input-output data type" specifies the type of input-output data, such as "JDF" and "PDL". In addition to "JDF" and "PDL", the formats to be specified further include text format, extension of image data, and intermediate data.

"Data read information" is information regarding the position for reading input-output data, the method for specifying the writing position, and the specified position. "RIP control mode" is information on "page mode" or "sheet mode". In addition, information regarding units used for the RIP parameters and information on data compression method are included as initial information.

"Input-output image information" includes "output image information", "input image information", and "image handling information". "Output image information" includes information regarding the format, resolution, size, color separation, color shift, and page orientation of output image data. "Input image information" includes information regarding the format, resolution, page range, and color settings of input image data. "Image handling information" includes information regarding magnification/reduction algorithm offset, object area, and halftone offset.

"PDL-related information" is information relating to PDL information targeted by RIP parameters, including "data area", "size information", and "data arrangement method". Here, the PDL information refers to data of a print target in a job, including intermediate data. "Data area" specifies information on the area in which the PDL information is stored. "Size information" specifies the data size of the PDL information. "Data arrangement method" specifies the data arrangement method of the PDL information in a memory, such as "little endianness" and "big endianness".

On the other hand, in "pass through mode", the job controller 116 generates RIP parameters based on JDF information and PDL information or intermediate data. In this case, in each item of the RIP parameters, information for referring to the corresponding item in JDF information is set.

As illustrated in FIG. 9, the RIP parameters include "RIP control mode". The RIP controller 119 controls the RIP engines 120 according to the "RIP control mode". Accordingly, a sequence is determined based on the "RIP control mode". As described above, as "RIP control mode", "page mode" or "sheet mode" is set.

"Page mode" refers to a processing which executes RIP processing for each of multiple pages to be aggregated in one sheet, before they are aggregated in one sheet, to generate raster data per page. "Sheet mode" refers to a processing which executes RIP processing for multiple pages to be aggregated in one sheet, to generate raster data per sheet.

When in "pass through mode", "RIP control mode" is specified as "pass through mode". Alternatively, "pass through mode" may be specified in items other than "RIP control mode".

The job controller 116 sets "RIP engine discrimination information" as RIP parameter. "RIP engine discrimination information" is information for discriminating the multiple RIP engines 120 included in the RIP unit 118. In the present embodiment, a RIP engine corresponding to and identical to the RIP engine 420 mounted on the HWF server 4 is used in the DFE 100.

Thus, the JDF information includes information for specifying one of the individual job receivers 112, as described above, and the specified individual job receiver 112 receives job data. Each of the individual job receivers 112 corresponds to one of the RIP engines 120. Each of the individual job receivers 112 adds discrimination information of the corresponding RIP engine 120 to the received JDF information. The job controller 116 adds "RIP engine discrimination information" to RIP parameters based on the discrimination information of the RIP engine 120 added to the JDF information.

In the RIP unit 118, the RIP controller 119 controls the multiple RIP engines 120 to cause the RIP engines 120 to execute RIP internal processings based on the input RIP parameters to generate raster data. The RIP controller 119 has a function capable of responding to a possible case in which the system receives print jobs from multiple different HWF servers 4.

An output-side job execution propriety determiner 121 refers to the raster data and calculates the amount of toner to be consumed when the raster data is printed out. The output-side job execution propriety determiner 121 determines whether toner will run out or not before the DFE 100 completes print output of the raster data, based on information regarding the remaining amount of toner in the DFE 100, received through the system controller 113, and the consumed amount of toner thus calculated.

There is a case in which different types of HWF servers 4 handle print job data in a different way. For example, "RIP control mode", such as "page mode" and "sheet mode", may be different. In a case in which the RIP engine 120 supports "page mode", in aggregation printing, data on each original page is sequentially specified according to the number of aggregation.

On the other hand, in a case in which the RIP engine 120 supports "sheet mode", data on all the original pages before being aggregated are specified, and then RIP processing is executed. Thus, the way of specifying parameters for the RIP engines 120 is different. Such a difference may be observed not only in "RIP control mode". For example, such a difference may be observed in the format of original data and/or the way of treating original data, such as the way of handling margin of original data.

In response to such a difference, the RIP controller 119 performs a parameter conversion processing for the RIP engine 120 which is caused to execute RIP processing. For example, when data supporting "page mode" is input in the RIP engine 120 which is supporting "sheet mode", a processing for converting parameters described with "page mode" into that described with "sheet mode" is executed. Functions of the RIP engines 120 are described in detail later.

An image storage 122 is a memory for storing raster data generated by the RIP engines 120. The image storage 122 can be implemented by the HDD 40 illustrated in FIG. 3. Alternatively, the image storage 122 may be a storage device connected to the DFE 100 through a USB interface or a network.

The printer controller 123 is connected to the digital engine 150. The printer controller 123 reads out the raster data stored in the image storage 122 and transmits it to the digital engine 150 to execute a print output. The printer controller 123 also acquires finishing information included in the in-DFE job attribute from the job controller 116 to control a finishing processing.

The printer controller 123 exchanges information with the digital engine 150, thereby acquiring information on the digital engine 150 itself. For example, the CIP4 sets a standard called Dev Caps for transmitting and receiving device specification information to/from printers, as a JDF information standard. Also, an information collecting method using a communication protocol called SNMP (Simple Network Management Protocol) and a database called MIB (Management Information Base) is known.

A device information manager 124 manages device information that is information on the DFE 100 itself and the digital engine 150. The device information includes information on the RIP engines 120 included in the RIP unit 118 and information on the individual job receivers 112 in the job receiver 111. The information on the individual job receivers 112 include information on "pass through mode".

A device information communicator 125 exchanges device information with the HWF server 4 through the network I/F 101 in accordance with the specification of MIB or JMF (Job Messaging Format). Thus, the device information communicator 415 of the HWF server 4 acquires device information from the DFE 100. As a result, information on the RIP engines 120 included in the DFE 100 and information on the individual job receivers 112 are reflected on GUI displayed on the client terminal 5.

As the printer controller 123 controls the digital engine 150 in the DFE 100 to complete a print output, the system controller 113 recognizes the job completion through the job controller 116. The system controller 113 then notifies the HWF server 4 of the completion of the print job through the job receiver 111. Thus, the job transceiver 421 of the HWF server 4 receives the job completion notification.

In the HWF server 4, the job transceiver 421 transfers the job completion notification to the job controller 413, and the job controller 413 notifies the workflow controller 418 of the job completion. Transmission of job data from the HWF server 4 to the DFE 100 is originally executed by the workflow controller 418 according to the workflow information.

As the DFE 100 determines that the job completes, the workflow controller 418 controls execution of the next processing according to the workflow information. The next processing following the print output by the DFE 100 may be, for example, a post-processing performed by the post-processor 3.

Figure 10:
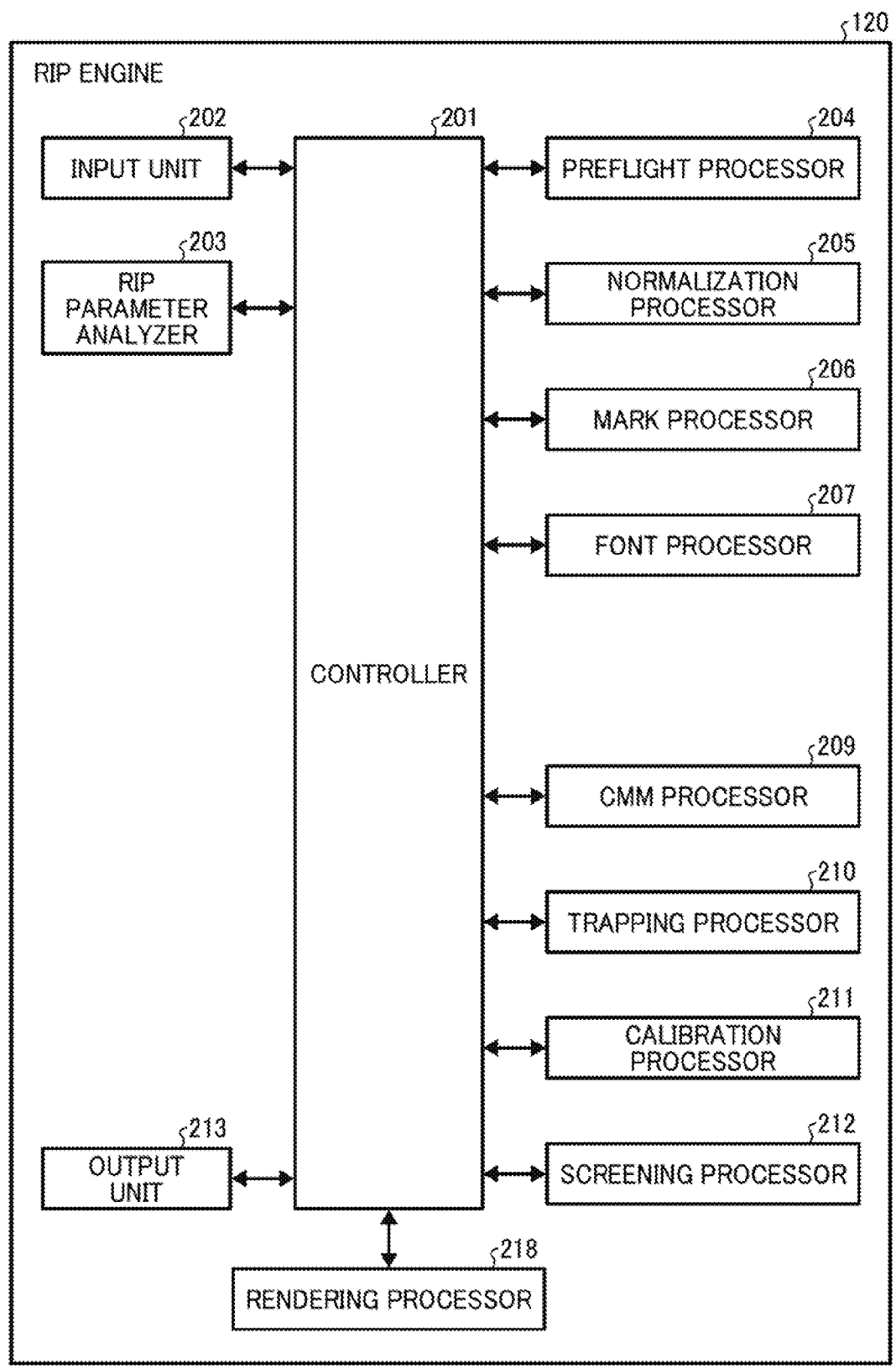
FIG. 10 is a block diagram illustrating a functional configuration of a RIP engine according to an embodiment of the present invention.

A functional configuration of the RIP engine is described below. FIG. 10 is a block diagram illustrating a functional configuration of the RIP engine 120 in a case in which a JDF analysis processing is performed by the JDF analyzer 117. As described above, the RIP engine 120 is a software module that generates raster data by executing RIP internal processings based on the RIP parameters illustrated in FIG. 9. The RIP engine may include APPE that is a PDF printing engine provided by Adobe Systems as a base.

As illustrated in FIG. 10, the RIP engine 120 includes a controller 201 and other parts. The parts other than the controller 201 each serves as an expansion part expandable by a vendor. The controller 201 executes RIP processing by using various functions included as the expansion parts.

An input unit 202 accepts an initialization request or a RIP processing execution request, and notifies the controller 201 of the request. In the case of the initialization request, the above-described MP parameters are also input in the controller 201. In response to receiving of an initialization request, the controller 201 inputs the RIP parameters, received together with the initialization request, in a RIP parameter analyzer 203. The controller 201 then acquires a RIP parameter analysis result obtained by the function of the RIP parameter analyzer 203 and determines the operation order of the expansion parts in the RIP engine 120 during the RIP processing. The controller 201 also determines the format of data generated as a result of the processing to be, for example, raster image, preview image, PDF, or intermediate data.

In response to receiving of a RIP processing execution request from the input unit 202, the controller 201 operates the expansion parts according to the operation order determined when receiving the initialization request. A preflight processor 204 confirms validity of the input PDL data content. When a wrong PDL attribute is found, the preflight processor 204 notifies the controller 201. In response to receiving of the notification, the controller 201 further notifies external modules, such as the REP controller 119 and the job controller 116, through an output unit 213.

Attribute information confirmed by a preflight processing is information which may possibly causes a case in which other modules included in the RIP engines 120 become unable to execute processings, for example, information regarding whether non-supported font is specified or not.

A normalization processor 205 converts the format of the input PDL data, when the format is Post Script, into PDF. A mark processor 206 expands graphic information on the specified mark and superimposes it on the specified position on the print target image.

A font processor 207 takes out font data and performs embedding of the font in PDL and outlining of the font. A CMM (Color Management Module) processor 209 coverts the color space of an input image into CMYK (Cyan, Magenta, Yellow, and Black) data based on a color conversion table described in an ICC (International Color Consortium) profile. The ICC profile refers to color ICC information and device ICC information.

A trapping processor 210 performs a trapping processing. The trapping processing refers to a processing which, when a position misalignment is caused between two adjoining different-color areas and a gap is formed at the boundary therebetween, expands each area to fill the gap.

A calibration processor 211 adjusts temporal variation and color-development balance variations among individual output devices so as to improve the degree of accuracy of color conversion performed by the CMM processor 209. These processings performed by the calibration processor 211 may be performed outside the RIP engine 120.

A screening processor 212 performs a halftone dot generation processing for the final output. Similar to the processings performed by the calibration processor 211, the processings performed by the screening processor 212 may be performed outside the RIP engine 120. The output unit 213 transmits a RIP result toward the outside. The RIP result is in the data format which is determined at the time of initialization, such as raster image, preview image, PDF, and intermediate data.

A rendering processor 218 performs a rendering processing that generates raster data based on input data. In the embodiment illustrated in FIG. 10, the processings to be performed by the mark processor 206 and the font processor 207 may be performed by the rendering processor 218 at the time of the rendering process.

Figure 11:
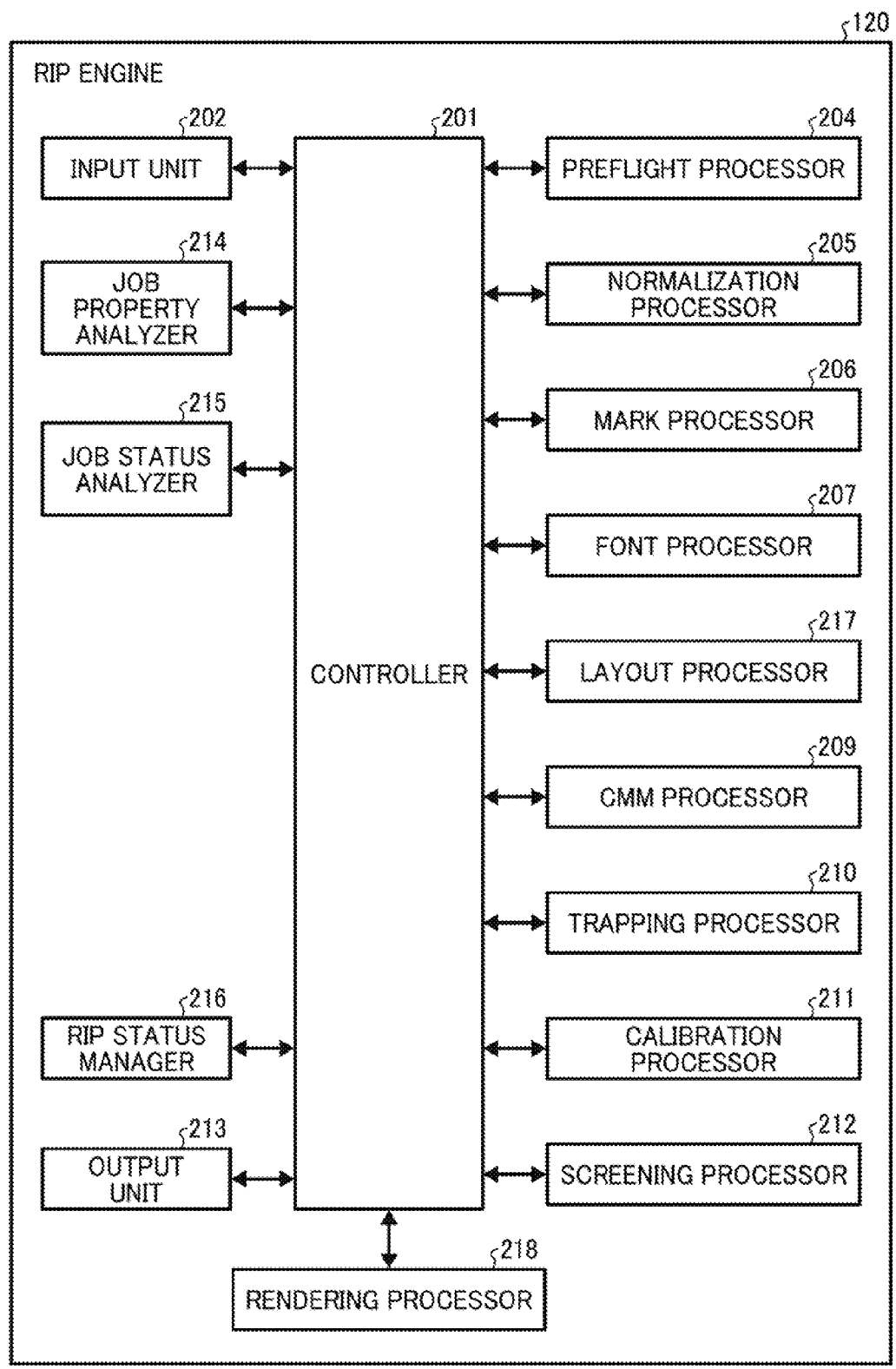
FIG. 11 is a block diagram illustrating a functional configuration of a RIP engine according to an embodiment of the present invention.

FIG. 11 is a block diagram illustrating a functional configuration of the RIP engine 120 in the case in which no JDF analysis processing is performed by the JDF analyzer 117. As described above, the case in which no JDF analysis processing is performed by the JDF analyzer 117 refers to a case in which RIP internal processings are distributed to the HWF server 4 and the DFE 100. Accordingly, the RIP engine 420 mounted on the HWF server 4 has the same configuration as the RIP engine 120 as illustrated in FIG. 11.

The functional configuration of the RIP engine 120 illustrated in FIG. 11, in which no JDF analysis processing is performed by the JDF analyzer 117, is almost the same as that illustrated in FIG. 10. Therefore, only differences between FIG. 11 and FIG. 10 are described below. In FIG. 11, the parts other than the controller 201 each serves as an expansion part, similar to the case illustrated in FIG. 10.

Referring to FIG. 11, in response to receiving of an initialization request from the input unit 202, the controller 201 acquires JDF information along with the initialization request. The controller 201 then analyzes JDF information and PDL information using the function of a job attribute analyzer 214 to determine the execution order of the expansion parts and the format of data generated by the processings, in the same manner as FIG. 10.

With respect to the RIP engine 120 mounted on the DFE 100, in many cases, the processing result is in the form of raster data so that the raster data can be input in the printer controller 123. On the other hand, with respect to the RIP engine 420 mounted on the HWF server 4, the data format of the processing result varies depending on the distribution condition of the processings between the HWF server 4 and the DFE 100. Thus, the controller 201 in the RIP engine 420 determines the data format of the processing result to be, for example, PDL information or intermediate data, based on the analysis result from the job attribute analyzer 214.

The controller 201 then analyzes RIP status information included in JDF information using the function of a RIP status analyzer 215 to confirm whether or not there exists a RIP internal processing which has already been executed. In a case in which there exists a RIP internal processing which has already been executed, the corresponding expansion part is eliminated from the processing target.

Alternatively, the RIP status analyzer 215 can perform the same processing by analyzing PDL information in place of analyzing the RIP status information included in JDF information. In this case, since PDL information no more includes any attribute information (e.g., parameter) regarding the RIP internal processing which has already been executed, it is possible to determine a RIP internal processing which has not been executed based on the remaining attribute information.

A layout processor 217 performs an imposition processing. A RIP status manager 216 rewrites the RIP status of each RIP internal processing which has been executed by each expansion part into "done" according to the control by the controller 201. The output unit 213 transmits a RIP result toward the outside of the engine. The RIP result is in a data format determined at the time of initialization.

The rendering processor 218 illustrated in FIG. 11 performs a rendering processing which generates raster data based on input data, in the same manner as that illustrated in 10. In the embodiment illustrated in FIG. 11, the processings to be performed by the mark processor 206, the font processor 207, and the layout processor 217 may be performed by the rendering processor 218 at the time of the rendering process.

Depending on the type of information regarding "RIP device specification" included in JDF information, in some cases, each of the multiple RIP engines 120 mounted on the DFE 100 is separately used as "DFE (Engine A)", "DFE (Engine B)", etc., as described above. Since the controller 201 cannot entrust a processing to an expansion part of other engine, the processing is performed by the job controller 116.

As described above, the job controller 116 adds "RIP engine discrimination information" to RIP parameters. More specifically, a different RIP parameter is generated for each RIP internal processing to be performed by a different specified RIP engine. For example, referring to FIG. 4, a RIP parameter for "engine A" specified to execute "font" and "layout", that for "engine B" specified to execute "mark", and that for "engine A" specified to execute the succeeding processes are separately generated.

The job controller 116 then requests the RIP unit 118 to execute RIP processing for each generated RIP parameter in the order according to the execution order of the RIP internal processes. Thus, the RIP internal processes are executed while "engine A" and "engine B" are used differently.

To make each engine execute the specified process only, it is possible to refer to information regarding the "RIP status". More specifically, by setting the statuses of the processings to be executed to "not yet" and those of the other processings to "done", only the specified processes can be executed.

As described above, the RIP engine 420 mounted on the HWF server 4 and the RIP engine 120 mounted on the DFE 100 are commonalized. These RIP engines are commonalized at least in a part regarding generation of raster data.

Thus, the RIP engine 420 and the RIP engine 120 are commonalized not in all the processings illustrated in FIG. 10 and FIG. 11. In particular, the RIP engine 420 and the RIP engine 120 are commonalized in at least the processors relating to generation of raster data, such as the mark processor 206, the font processor 207, the layout processor 217, and the rendering processor 218. Such a configuration in which only the processors relating to generation of raster data are commonalized is a minimum specification. Of course, the other processors can be commonalized.

Figure 12:
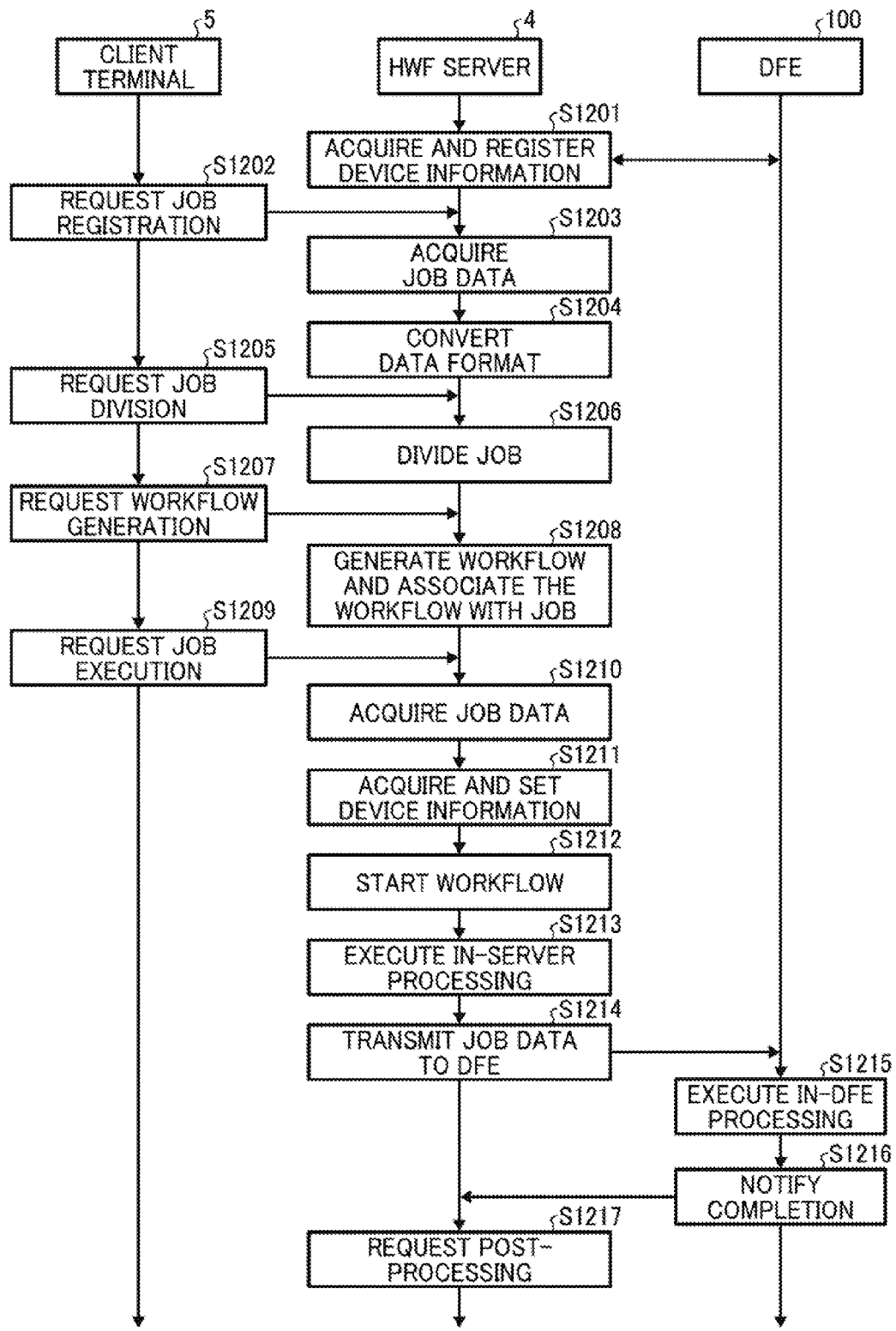
FIG. 12 is a block diagram illustrating an overall operation of a HWF system according to an embodiment of the present invention.

An operation of the system according to an embodiment is described below with reference to FIG. 12. FIG. 12 is a sequence diagram illustrating an operation performed by the HWF system according to an embodiment of the present invention. FIG. 12 illustrates a case in which the digital printer 1 executes a print output. Referring to FIG. 12, in the HWF server 4, the device information communicator 415 acquires device information from the DFE 100 and/or the CTP 200 through the network, and the device information manager 416 registers the acquired device information in the device information storage 417 (S1201). In this example, the step S1201 is periodically performed.

Alternatively, as a job data registration operation is performed by an operator through GUI of the system, the client terminal 5 transmits a job registration request to the HWF server 4 (S1202). In the HWF server 4, the UI controller 412 acquires the job registration request. Thus, the data receiver 411 acquires job data according to the control performed by the system controller 410 (S1203).

As the data receiver 411 acquires job data, the system controller 410 controls the job controller 413 to convert the format of the acquired job data into PDL format (S1204). The job data, the format of which has been converted, is registered in the job data storage 414. The job registration operation is performed through the GUI in the step S1202. The GUI displays an interface for specifying registration target data by file path and also displays an input interface for specifying each item included in JDF information illustrated in FIG. 4.

In the step S1201, the HWF server 4 acquires information regarding the type of RIP engine mounted on the DFE 100. Accordingly, it is possible to select one of the RIP engines in the DFE to execute, through entry fields for specifying "RIP device specification" information illustrated in FIG. 4 displayed on the GUI of the client terminal 5.

Figures 13, 14:
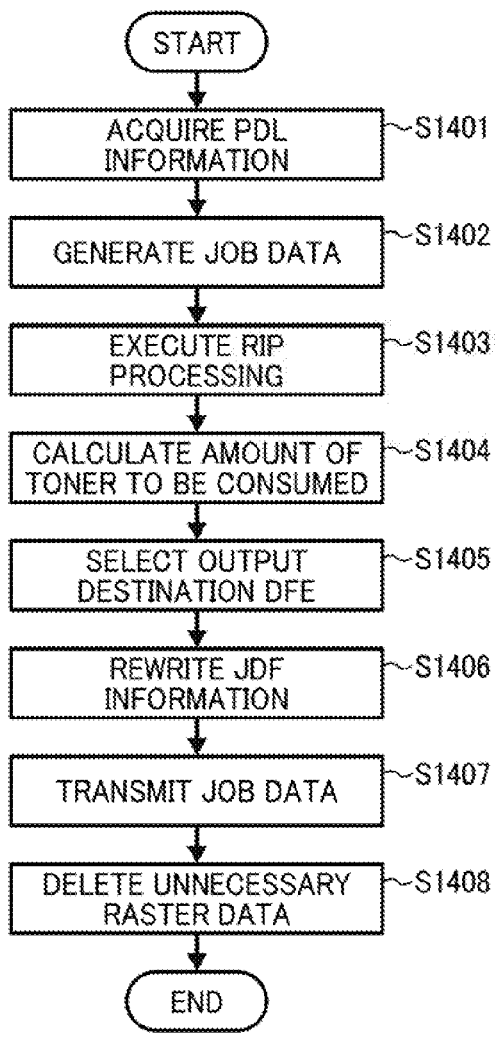
FIG. 13 is an illustration for explaining information regarding division request according to an embodiment of the present invention.
FIG. 14 is a flowchart illustrating a processing in a HWF server according to an embodiment of the present invention.

As a job data division operation is performed by an operator through GUI of the system, the client terminal 5 transmits a job division request to the HWF server 4 (S1205). FIG. 13 is an illustration of information included in the job division request transmitted in the step S1205. As illustrated in FIG. 13, the job division request includes information on a target job to be divided and information on division contents. The information on division contents refers to information which specifies a device to execute a print output for each page.

In response to receiving of the job division request by the HWF server 4, the system controller 410 divides the target job to be divided specified in the information illustrated in FIG. 13, page by page, according to the division contents. Thus, divided jobs are generated separately (S1206). Each device specified for each divided range is used as "device specification" information in JDF information illustrated in FIG. 4. Each of the divided job is separately stored in the job data storage 414.

As a workflow generation operation is performed by an operator through GUI of the system, the client terminal 5 transmits a workflow generation request to the HWF server 4 (S1207). The workflow generation request includes information for specifying workflow contents as shown in FIG. 6 and information for specifying a job to be processed according to the workflow.

In response to receiving of the workflow generation request by the HWF server 4, the system controller 410 inputs information received along with the request in the workflow controller 418. The workflow controller 418 then generates new workflow information based on the received information and stores it in the workflow information storage 419. In addition, the workflow controller 418 associates the workflow with the job specified in the request (S1208). Association of the workflow with the job can be executed by, for example, adding an identifier for identifying the workflow to JDF information.

As a job execution operation is performed by an operator through GUI of the system thereafter, the client terminal 5 transmits a job execution request to the HWF server 4 (S1209). Each of the steps S1202 to S1209 may be separately executed in response to respective operations. Alternatively, the job registration request, the job division request, the workflow generation request, and the job execution request may be executed in response to one time of operation.

In response to receiving of the job execution request by the HWF server 4, the system controller 410 acquires the specified job data from the job data storage 414 based on information for specifying job data received along with the request (S1210). The system controller 410 also acquires the latest information on the device specified in the acquired job data from the device information manager 416 and sets the device information to the job (S1211).

The system controller 410 then transfers the job data to the workflow controller 418 to start execution of the workflow (S1212). The workflow controller 418 acquires the workflow information associated with the acquired job data from the workflow information storage 419 and executes a processing according to the workflow information.

In the workflow processing, first, an in-server processing to be executed by the RIP engine 420 mounted on the HWF server 4 is executed (S1213). In the step S1213, the job controller 413 causes the RIP engine 420 to execute the processing, as described above, according to the control performed by the workflow controller 418.

As the workflow reaches the processing in the DFE 100 thereafter, the job controller 413 controls the job transceiver 421, according to the control by the workflow controller 418, to transmit the job data to the DFE 100 (S1214). In the step S1214, the job controller 413 specifies one of the multiple individual job receivers 112 which corresponds to the information specified in JDF information.

As one of the multiple individual job receivers 112 is specified when the job data is transmitted to the DFE 100, a proper individual job receiver 112 can receive the job data in the DFE 100. As the job data is input in the DFE 100, as described above, RIP processing and an output processing by the digital engine 150 are executed in the DFE 100 (S1215).

In the DFE 100, when the specified processing completes, the job receiver 111 notifies the HWF server 4 of the completion (S1216). In response to receiving of the completion notification from the DFE 100 through the job transceiver 421, the job controller 413 notifies the workflow controller 418 of the completion. The workflow controller 418 then requests the post-processor 3 to execute a post-processing which is specified in the workflow as the next processing to the control in the DFE 100 (S1217).

In the step S1217, the job controller 413 controls the job transceiver 421 according to the control by the workflow controller 418 to request the post-processor 3 to execute a post-processing. Thus, the operation of the system is completed.

FIG. 14 is a flowchart of the in-server processing performed in the step 1213 illustrated in FIG. 12. Referring to FIG. 14, first, the data receiver 411 acquires PDL information input from the client terminal 5 (S1401). The job controller 413 then generates job data based on the acquired PDL information (S1402). At this time, JDF information that is generated based on an operation performed by an operator through the client terminal 5 is added to the job data.

The job controller 413 then starts execution of the job based on the control by the workflow controller 418. In a case in which propriety determination by the job execution propriety determiner 422 is specified in the workflow, the job controller 413 transmits the job data to the RIP engine 420 and causes the RIP engine 420 to execute RIP processing (S1403). The job execution propriety determiner 422 then analyzes raster data generated by the RIP processing and calculates the amount of each of cyan, magenta, yellow, and black (hereinafter "CMYK") toners to be consumed (S1404).

In the step S1403, RIP engines each corresponding to the respective digital printers 1a, 1b, etc., generate raster data. In the step S1404, the amount of toner to be consumed is calculated for each digital printer 1a, 1b, etc., based on the raster data generated by the corresponding RIP engine.

The job execution propriety determiner 422 refers to the remaining amounts of CMYK toners in each digital printer 1, having been previously acquired from the digital printers 1a, 1b, etc., and managed by the device information manager 416, and compares them with the amounts of CMYK toners to be consumed, respectively. The job execution propriety determiner 422 determines one of the DFEs 100 in one of the digital printers 1 in which the remaining amount of toner is greater than the amount of toner to be consumed as the output destination of the job data, and transmits the determination result to the job controller 413 (S1405).

The job controller 413 rewrites JDF information based on the determination result (S1406). In particular, "device specification" information in JDF information is rewritten into information for specifying the digital printer 1 which is determined to be the output destination of the job data. The job controller 413 then transmits the job data to the DFE 100 (S1407) and deletes unnecessary raster data (S1408). The unnecessary raster data refers to raster data which is received from the DFE 100 which has not been selected as the output destination of the job data. In other words, the unnecessary raster data refers to raster data transmitted from the digital printer 1 which has not been specified in the rewritten JDF information. Thus, the in-server processing is completed. In the steps S1405 to S1407, the job controller 413 serves as a job data output destination determiner.

Figure 15:
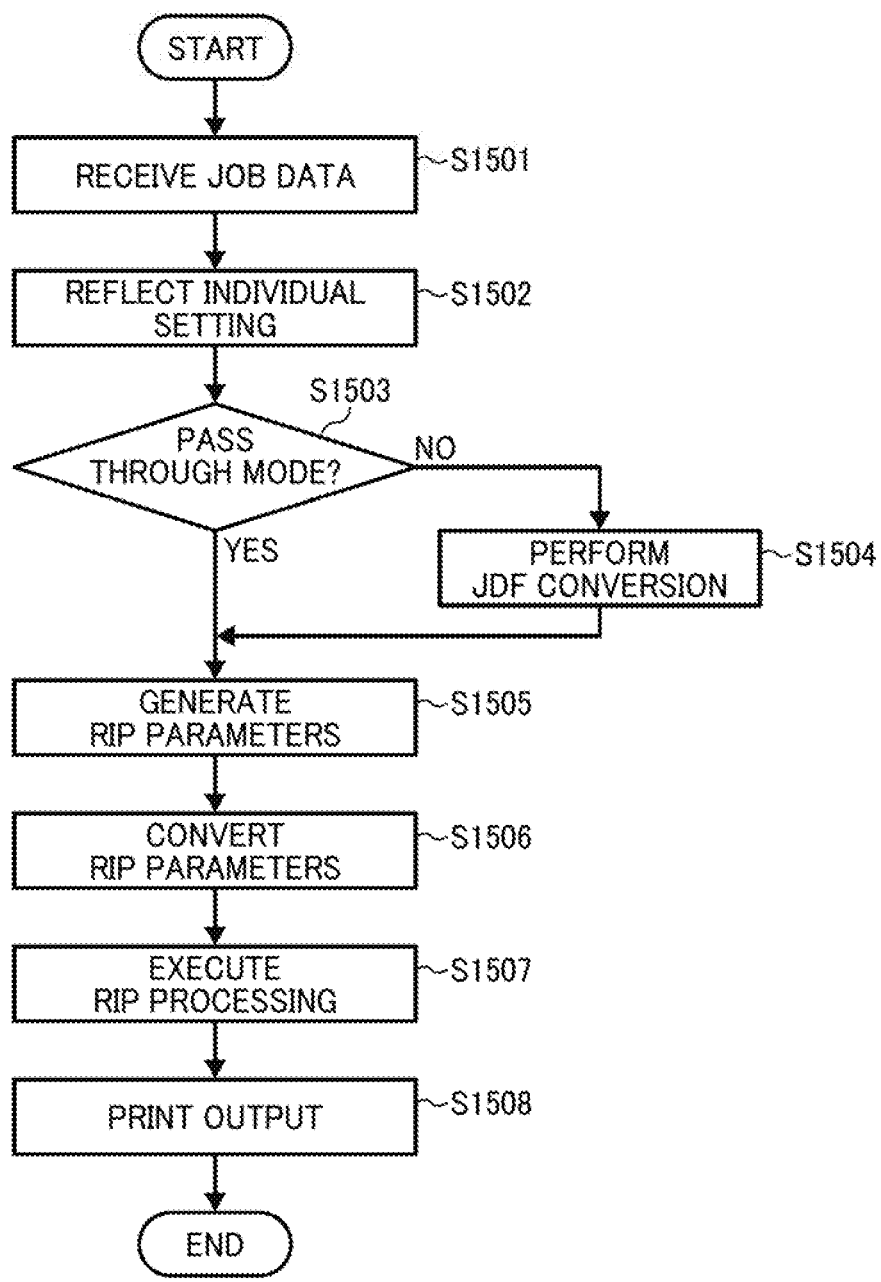
FIG. 15 is a flowchart illustrating a processing in a DFE according to an embodiment of the present invention.

FIG. 15 is a flowchart of the in-DFE processing performed in the step 1215 illustrated in FIG. 12. Referring to FIG. 15, first, one of the individual job receivers 112 which is specified when job data is transmitted from the HWF server 4 receives job data (S1501). In response to receiving of the job data, the individual job receiver 112 updates JDF information so as to reflect its individual setting to the job data (S1502).

The setting of the above-described "pass through mode" is also reflected in the step S1502. The job data to which the individual setting has been reflected is input in the system controller 113. The system controller 113 stores the input job data in the job data storage 114 according to the settings, and performs a preview processing through the UI controller 115 according to an operation performed by an operator.

At the timing of job execution in the DFE 100, such as a timing of an operator's operation or a timing getting to the execution time, the system controller 113 inputs the job data in the job controller 116. The job controller 116 refers to the input job data and confirms whether pass through mode is specified or not (S1503). When it is determined that pass through mode is not specified (S1503/No), the job controller 116 inputs the job data in the JDF analyzer 117 to generate an in-DFE job attribute (S1504).

When it is determined in the step S1503 that pass through mode is specified (S1503/Yes), or when JDF conversion is completed and an in-DFE job attribute is generated, the job controller 116 generates RIP parameters (S1505). In a case in which pass through mode is not specified, RIP parameters illustrated in FIG. 9 are generated in the step S1505. In a case in which pass through mode is specified, RIP parameters containing information illustrated in FIG. 9 other than "input-output image information" are generated. The other parts refer to JDF information.

Upon generation of the RIP parameters, the job controller 116 inputs necessary information in the RIP unit 118 and causes the RIP unit 118 to execute RIP processings. Thus, the RIP controller 119 performs the above-described parameter conversion (S1506). The RIP controller 119 causes the RIP engine 120 to execute RIP processings while specifying the converted parameters. Thus, the RIP engine 120 generates raster data.

In the step S1505, as described above, RIP parameters are generated for each RIP engine based on the "RIP device designation" information illustrated in FIG. 4. In the step S1507, each of the generated RIP parameters is RIP-processed in order, thus generating raster data.

When acquiring the generated raster data from the RIP unit 118, the job controller 116 inputs the raster data in the printer controller 123 to cause the digital engine 150 to execute a print output (S1508). Thus, the in-DFE processing is completed.

Figure 16:
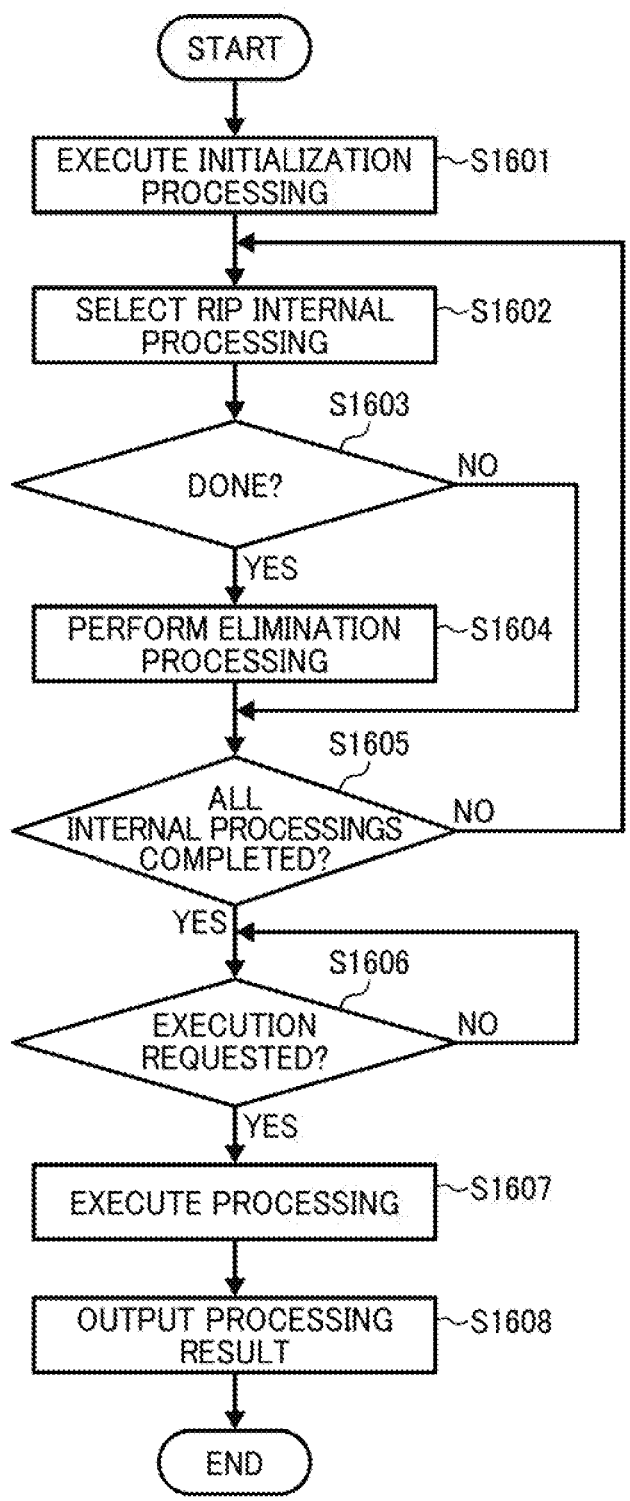
FIG. 16 is a flowchart illustrating a RIP processing according o an embodiment of the present invention.

FIG. 16 is a flowchart of the RIP processing performed in the step 1507 illustrated in FIG. 15. Referring to FIG. 16, first, the controller 201 executes an initialization processing based on an initialization request input in the input unit 202 (S1601). In the step S1601, in the case of the embodiment illustrated in FIG. 10, the RIP parameter analyzer 203 receives and analyzes the RIP parameter to determine which one of the expansion parts included in the RIP engines 120 to execute the processing and the operation order of the expansion parts. In addition, the RIP parameter analyzer 203 determines the format of data generated as a result of the processing.

In the case of the embodiment illustrated in FIG. 11, the job attribute analyzer 214 receives and analyzes JDF information and PDL information to determine which one of the expansion parts to execute the processing and the operation order of the expansion parts. In addition, the job attribute analyzer 214 determines the format of data generated as a result of the processing. Next, in the case of the embodiment illustrated in FIG. 11, the controller 201 causes the RIP status analyzer 215 to execute a status analysis.

In the status analysis, the RIP status analyzer 215 refers to "RIP status" illustrated in FIG. 4 and selects one item from the RIP internal processings (S1602). When the status is "done" (S1603/Yes), the corresponding expansion part is eliminated from the execution target expansion parts determined in the step S1601 (S1604). When the status is "not yet" (S1603/No), no processing is executed.

The RIP status analyzer 215 repeats the processings from the step S1602 to the step S1604 until all items in the RIP internal processings undergo these processings (S1605/No). After the RIP status analyzer 215 completes repeating the processings from the step S1602 to the step S1604 until all items in the RIP internal processings undergo these processings (S1606/Yes), as the input unit 202 acquires a RIP processing execution request (S1606/Yes), the controller 201 causes each expansion part to execute a processing in order (S1607).

In the step S1607, only the expansion pans which have been determined in the step S1601 and have not been eliminated in the step S1604 are requested to execute the processings according to the execution order determined in the step S1601. As the expansion parts execute the processings to generate raster data, the output unit 213 outputs a processing result (S1608). Thus, the processing by the RIP unit 118 is completed.

The raster data thus generated by the RIP processings reproduces an image input from the client terminal 5 by means of enumeration and aggregation of colored dots. In such a data reproduction method, color concentration is expressed by dot arrangement density. Thus, by converting an input image into raster data and analyzing the raster data, the amounts of CMYK toners to be consumed can be calculated at a high degree of accuracy.

Figures 17, 18, 19:
FIG. 17 is an illustration of the amounts of toners to be consumed according to an embodiment of the present invention.
FIG. 18 is an illustration of the remaining amounts of toners according to an embodiment of the present invention.
FIG. 19 is an illustration of an execution example of an output destination device selection processing according to an embodiment of the present invention.

FIG. 17 is an illustration showing the amounts of toners to be consumed calculated by analyzing raster data. The job controller 413 refers to raster data generated by the RIP processings to calculate the amounts of toners to be consumed in a print job. How to calculate the amounts of toners to be consumed is described below with reference to FIG. 17.

Jobs A, B, C, and D are print jobs which print respective raster data. In FIG. 17, the maximum values and the minimum values of the consumed amounts of toner in a single job are enclosed with broken lines and dotted lines, respectively. Referring to FIG. 17, in Job A, the same amounts of cyan, magenta, yellow, and black toners are consumed. In Job B, the consumed amount of cyan toner is maximum, and the consumed amounts of yellow and black toners are minimum. In Job C, only black toner is consumed. Accordingly, Job C is a print job for monochrome printing. In Job D, the consumed amounts of cyan and yellow toners are maximum, and the consumed amount of magenta toner is minimum.

FIG. 18 is an illustration showing the remaining amounts of toners in the digital printers 1a, 1b, 1c, 1d, and 1e. Information on the remaining amounts of toners is transmitted from each of the digital printers 1a, 1b, 1c, 1d, and 1e to the HWF server 4, and the device information manager 416 manages the information while linking them with the corresponding DFE 100. In FIG. 18, the maximum values and the minimum values of the remaining amounts of each toner in a single printer are enclosed with broken lines and dotted lines, respectively. As shown in FIG. 18, the remaining amounts of toners vary among the digital printers 1a, 1b, 1c, 1d, and 1e. In the present embodiment, print jobs are distributed to the digital printers 1 in such a manner that the remaining amount of each toner never exceeds the consumed amount of each toner (i.e., toner will not run out).

The information on the consumed amounts of toners and the remaining amounts of toners, shown in FIGS. 17 and 18, respectively, is treated as input data when determining the output destination device of a print job.

FIG. 19 is an illustration of an execution example of an output destination device selection processing which compares the consumed amount of toner and the remaining amount of toner. As described above, one of the digital printers 1 in which the remaining amount of toner is greater than the consumed amount of toner is selected as the output destination of a print job.

As shown in FIG. 18, in the digital printer 1e, the remaining amounts of CMYK toners are all small. If the digital printer 1e is caused to execute Job D that consumes a large amount of toner, toner would run out during print output, causing delay in the print job. In view of this situation, the HWF server 4 automatically distributes Job D to the device other than the digital printer 1e.

As shown in FIG. 19, the control is performed in such a manner that the print job is not transmitted to a device which is assumed to exhaust toner during execution of print output. Thus, the print job is automatically distributed in such a manner that toner will not run out in the digital printer 1.

In the HWF system according to the present embodiment, the amount of toner to be consumed in a print job is calculated based on raster data, and one of the digital printers 1 in which the remaining amount of toner is greater than the amount of toner to be consumed is caused to execute a printing. Thus, the occurrence of toner shortage is prevented during a print output.

In the present embodiment, the status analysis processing (i.e., the processing through the steps S1602 to S1605) is executed only in a case in which the RIP engine 120 is compliant with pass through mode, as is the case illustrated in FIG. 10. This is based on the fact that the status analysis processing is required when RIP processings are distributed to the HWF server 4 and the DFE 100.

In this case, since an identical RIP engine is mounted on each of the HWF server 4 and the DFE 100, the RIP processings are executed as a series of processings without a distinction between the HWF server 4 and the DFE 100 being perceived. Therefore, it is preferable that data processed by the RIP engine 420 in the HWF server 4 is input in the RIP engine 120 in the DFE 100 as it is. Pass through mode in which data does not pass through the JDF analyzer 117 provided outside of the RIP engine is suitable in this case.

The above case is just one example. Even when pass through mode is not specified, the status analysis processing is required when RIP processings are distributed to the HWF server 4 and the DFE 100. In a case in which RIP processings are distributed to the HWF server 4 and the DFE 100, the processings which have already been executed in the HWF server 4 should be eliminated in the DFE 100 side.

Even in a case in which the RIP engine 120 is not compliant with pass through mode, the RIP status analyzer 215 may be provided so that RIP processings can be distributed to the HWF server 4 and the DFE 100. In other words, even in a case in which RIP processings are distributed to the HWF server 4 and the DFE 100, it is possible that the JDF analyzer 117 in the DFE 100 performs JDF analysis and the RIP status analyzer 215 performs status analysis, to determine necessary RIP internal processings.

According to an embodiment of the present invention, the amount of toner to be consumed in a print output is calculated at a high degree of accuracy by analyzing raster data. It is also possible to execute the processings described below.

FIG. 20 is an illustration of an execution example of a print job distribution processing based on the amounts of toners remaining after execution of a print job. In the present embodiment, print jobs are distributed in such a manner that variation in remaining amounts of toners becomes as small as possible. More specifically, the standard deviation of the remaining amounts of CMYK toners is calculated, and print jobs are distributed such that the standard deviation becomes as small as possible. Such a processing for distributing print jobs in such a manner that the standard deviation (i.e., variation) of the remaining amounts of CMYK toners becomes small as possible is described in detail below.

As illustrated in FIG. 17, Job A is a print job in which the consumed amount of each of CMYK toners is 10. When this print job is distributed to one of the multiple digital printers 1 in which the remaining amount of each of CMYK toners is close to 10, the standard deviation of the remaining amounts of CMYK toners after execution of the print job becomes as small as possible. Referring to FIG. 20, when Job A is distributed to the digital printer 1b or 1e, the remaining amounts of CMYK become equal after execution of the print job.

When Job A is distributed to the digital printer 1e, the remaining amount of each toner in the digital printer 1e becomes 0. In a case in which a toner replenishment or replacement time limit is set according to a maintenance of the HWF system but the time limit has not expired, the digital printer 1e may be eliminated from the print job output destination devices. Alternatively, the print job may be preferentially distributed to the digital printer 1 in which the remaining amount of toner is larger.

In Job B, the consumed amount of cyan toner is the largest, and the consumed amounts of yellow and black toners are relatively small. Referring to FIG. 20, when Job B is distributed to the digital printer 1b, the standard deviation of the remaining amounts of CMYK toners becomes the smallest. Thus, when Job B is distributed to the digital printer 1b, the standard deviation of the remaining amounts of CMYK toners after execution of the print job becomes small.

In view of this, when each print job is distributed in such a manner that the standard deviation of the remaining amounts of CMYK toners after execution of the print job becomes the smallest, Job C and Job D are automatically distributed to the digital printers 1b and 1c, respectively. When each print job is distributed in such a manner that the standard deviation of the remaining amounts of CMYK toners after execution of the print job becomes the smallest, a timing when each toner cartridge of cyan, magenta, yellow, or black toner becomes empty gets closer to each other. Thus, with such a configuration, toners in the toner cartridge can be consumed in an efficient manner.

FIG. 21 is an illustration of a comparison result among CMYK toners with respect to consumed amount thereof during each print job. FIG. 22 is an illustration of a comparison result among CMYK toners with respect to remaining amount thereof before execution of each print job. In the embodiments illustrated in FIGS. 21 to 23, the digital printer 1 to output a print job is selected by referring to the ratio among the consumed amounts of toners and the ratio among the remaining amounts of toners.

FIG. 21 compares the consumed amounts of CMYK toners. The ratio thereamong coming closer to 1 means the consumed amounts thereof coming closer to each other. Since Job A is a print job in which the same amounts of CMYK toners are consumed, the ratio among CMYK toners with respect to consumed amount is 1:1:1:1 in Job A.

In Job B, the ratio among CMYK toners with respect to consumed amount is 3:2:1:1. In Job C, which is monochrome printing, the toners other than black toner are not consumed. In Job D, the ratio among CMYK toners with respect to consumed amount is 50:1:50:2.

FIG. 22 compares the remaining amounts of CMYK toners before execution of each print job. The ratio thereamong coming closer to 1 means the remaining amounts thereof coming closer to each other. In the digital printer 1a, the ratio among CMYK toners with respect to remaining amount is 6:4:3:2.

In the digital printer 1b or 1e, the remaining amounts of all the toner are equal. Therefore, the ratio among CMYK toners with respect to remaining amount is 1:1:1:1. In the digital printers 1c and 1d, the ratio among CMYK toners with respect to remaining amount is 5:1:5:1 and 4:7:10:3, respectively.

FIG. 23 is an illustration of a print job distribution processing executed based on the consumed amount ratio and the remaining amount ratio among CMYK toners. In the present embodiment, each print job is distributed to one of the digital printer 1 in which variation in difference between the consumed amount ratio and the remaining amount ratio among CMYK toners is the smallest.

With such a configuration, print job distribution is controlled in view of the remaining amount ratio among CMYK toners. In particular, a print job is distributed in such a manner that a toner which is remaining in a large amount is preferentially consumed. Accordingly, it is possible to control a timing for replacing CMYK toner cartridges integrally included in the digital printer 1.

When a print job in which CMYK toners are consumed according to the remaining amount ratio thereamong is executed, there may be a case in which the remaining amount ratio and the consumed amount ratio among CMYK toners become equal and therefore multiple output destination devices are specified. In this case, a print job can be output to the digital printer 1 in which toner is remaining in a larger amount. When the remaining amount of toner is identical among multiple digital printers 1, the HWF system can previously prioritize the digital printers 1 to automatically output a print job to suitable one of the digital printers 1.

FIG. 14 is a flowchart of an operation in which the RIP engine 420 in the HWF server 4 generates raster data and the job execution propriety determiner 422 performs determination. Alternatively, as described above, it is possible that the RIP engines 120 in the digital printers 1a, 1b, etc. generate raster data and the output-side job execution propriety determiner 121 performs determination and transmits the determination result to the HWF server 4.

In this case, in place of the processings in the steps S1403 and S1404, job data to be output is transmitted, along with a job execution propriety determination request, from the HWF server 4 to each of the digital printers 1a, 1b, etc. The processing in the step S1405 and the succeeding processings are then executed based on the determination results from the digital printers 1a, 1b, etc.

An operation of the DFE 100 in response to receiving of a job execution propriety determination request and job data to be output is described below with reference to FIG. 24. Information received by the DFE 100 includes workflow information which specifies that the output-side job execution propriety determiner 121 performs execution propriety determination for a print job based on the consumed amount and the remaining amount of toner and returns the determination result to the HWF server 4. The job controller 413 transmits job data, to which an execution propriety determination execution command is added, to the DFE 100 according to the workflow information. In the DFE 100, the processings similar to the steps S1501 to S1505 illustrated in FIG. 15 are performed. After RIP processings are performed in the RIP unit 118, the job execution propriety determination result is returned to the HWF server 4 according to the workflow. Thus, raster data generated by RIP processings in the DFE 100 is treated as information regarding execution propriety determination of a print job in the DFE 100.

After the processings similar to the steps S1501 to S1505 are performed, the job controller 116 recognizes that execution propriety determination for a print job is performed based on the workflow information. The job controller 116 then executes the processings similar to the steps S1506 and S1507 illustrated in FIG. 15 for determining execution propriety for the print job. Thus, RIP processings are performed.

As raster data is generated by the processings through the steps S1501 to S1507, the output-side job execution propriety determiner 121 performs execution propriety determination according to the command from the job controller 116 (S2401). In the step S2401, the output-side job execution propriety determiner 121 refers to the generated raster data and calculates the amount of toner to be consumed at the time when the raster data is printed out. The output-side job execution propriety determiner 121 further determines whether toner will run out or not before the DFE 100 completes print output of the raster data, based on information regarding the remaining amount of toner in the DFE 100, received through the system controller 113, and the consumed amount of toner thus calculated. The generated raster data is saved after the execution propriety determination to be prepared for a situation in which a print output is actually performed.

The job controller 116 then transmits the determination result made by the output-side job execution propriety determiner 121 to the system controller 113. The system controller 113 transmits the determination result to the HWF server 4 through the device information communicator 125 and the network I/F 101 (S2402). The determination result is transmitted from each of the digital printers 1a, 1b, etc. to the HWF server 4.

In response to receiving of the determination result from each DFE 100, the HWF server 4 selects one of the DFEs 100 as an output destination of the print job based on the determination result, through the processings similar to the steps S1405 to S1407. Job data is then transmitted to the DFE 100 which is selected as the output destination. The HWF server 4 transmits command information for deleting raster data of the DFE 100 which has not been selected as the output destination.

In the digital printer 1 which has been selected as the output destination, the job receiver 111 receives the job data (S2403/Yes). The job controller 116 inputs the received job data in the printer controller 123. The printer controller 123 controls the digital engine 150 to execute a print output (S2404). The job controller 116 then deletes the raster data which has been printed out from the image storage 122.

On the other hand, when the job receiver 111 receives a command for deleting raster data (S2406/Yes) without receiving job data (S2403/No), the job controller 116 commanded through the system controller 113 executes the processing of the step S2405. Thus, the operation in the DFE 100, which has received a job execution propriety determination request and job data to be output, is completed.

Figure 24:
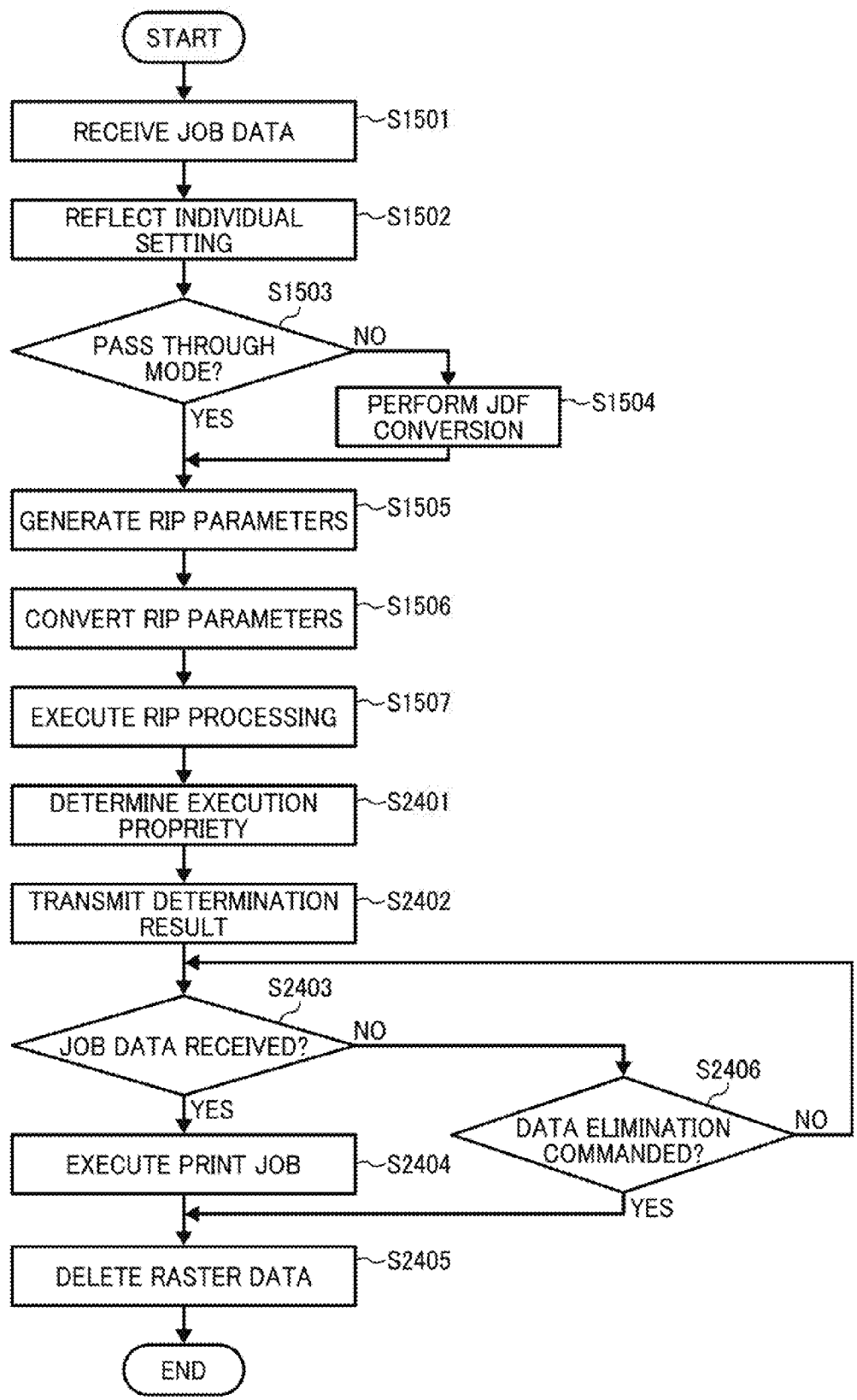
FIG. 24 is a flowchart illustrating a print job execution propriety determination processing in a DFE according to an embodiment of the present invention.

According to the embodiment illustrated in FIG. 24, execution of a print job execution propriety determination and RIP processings therefor can be distributed to the DFE 100, thereby reducing the load on the HWF server 4. In addition, in the DFE 100 that finally performs a print output, raster data that is generated for calculating the amount of toner to be consumed is used for the print output, thereby improving the efficiency of the processing.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An image processing system, comprising:
    a processing execution control device including:
        a processing execution controller to control execution of a plurality of processings; and
        a control-side drawing information generator to generate, as one of the plurality of processings, drawing information based on output target image information;
    a plurality of image formation output control devices, each of which including;
        an output-side drawing information generator corresponding to the control-side drawing information generator, to generate the drawing information based on the output target image information acquired from the processing execution control device; and
        an execution controller to control at least one of a plurality of image forming devices to execute an image formation output based on the drawing information generated by the output-side drawing information generator; and
    an output destination determiner to determine one of the plurality of image formation output control devices as an output destination of an image formation output execution command based on execution propriety of the image formation output, the execution propriety determined by comparing an amount of developer to be consumed in the image formation output, that is calculated from the drawing information, with an amount of developer remaining in each of the image forming devices.

2. The image processing system of claim 1,
    wherein the developer includes a plurality of developers having different colors, and
    wherein the output destination determiner calculates a variation in remaining amount among the developers during the image formation output for each one of the image formation output control devices, and determines one of the image formation output control devices having the smallest variation as the output destination.

3. The image processing system of claim 1, wherein the processing execution control device further includes:
    an execution propriety determiner to determine the execution propriety of the image formation output by comparing the amount of developer to be consumed in the image formation output, that is calculated from the drawing information, with the amount of developer remaining in each of the image forming devices.

4. The image processing system of claim 1, wherein each of the image formation output control devices further includes:
    an output-side execution propriety determiner to determine the execution propriety of the image formation output by comparing the amount of developer to be consumed in the image formation output, that is calculated from the drawing information, with the amount of developer remaining in each of the image forming devices.

5. The image processing system of claim 1,
    wherein the developer includes a plurality of developers having different colors, and
    wherein the output destination determiner calculates a variation in difference between a remaining amount ratio among the developers and a consumed amount ratio among the developers based on the drawing information, and determines one of the image formation output control devices having the smallest variation as the output destination.

6. The image processing system of claim 5,
    wherein, when two or more of the image formation output control devices have the smallest variation in difference between the remaining amount ratio among the developers and the consumed amount ratio among the developers, one of the two or more of the image formation output control devices having the largest remaining amount of the developers is determined as the output destination.

7. The image processing system of claim 5,
    wherein, when two or more of the image formation output control devices have the smallest variation in difference between the remaining amount ratio among the developers and the consumed amount ratio among the developers, one of the image formation output control devices which has been previously selected is determined as the output destination.

8. The image processing system of claim 5,
    wherein, when two or more of the image formation output control devices have the smallest variation in difference between the remaining amount ratio among the developers and the consumed amount ratio among the developers, one of the image formation output control devices in which a replacement limit of the developer has expired is determined as the output destination.

9. An image processing method, comprising;
executing a plurality of processings in a preset order to execute an image formation output,
generating drawing information based on output target image information, as one of the plurality of processings;
calculating an amount of developer to be consumed by each one of a plurality of image forming devices when executing the image formation output based on the drawing information;
determining execution propriety of the image formation output based on a comparison between the calculated amount of developer to be consumed and a remaining amount of developer in each of the image forming devices; and
determining one of the plurality of image forming devices as an output destination of an image formation output execution command that instructs execution of the image formation output based on the execution propriety of the image formation output.

10. A non-transitory recording medium storing a plurality of instructions which, when executed by one or more processors, cause the processors to perform a method, comprising:
executing a plurality of processings in a preset order to execute an image formation output;
generating drawing information based on output target image information, as one of the plurality of processings;
calculating an amount of developer to be consumed by each one of a plurality of image forming devices when executing the image formation output based on the drawing information;
determining execution propriety of the image formation output based on a comparison between the calculated amount of developer to be consumed and a remaining amount of developer in each of the image forming devices; and
determining one of the plurality of image forming devices as an output destination of an image formation output execution command that instructs execution of the image formation output based on the execution propriety of the image formation output.

* * * * *